(12) United States Patent
Beser

(10) Patent No.: US 9,071,498 B2
(45) Date of Patent: Jun. 30, 2015

(54) SYSTEMS AND METHODS FOR FRACTIONAL ROUTING REDUNDANCY

(75) Inventor: Nurettin Burcak Beser, Palo Alto, CA (US)

(73) Assignee: Telsima Corporation, Santa Clara, CA (US)

(*) Notice: Subject to any disclaimer, the term of this patent is extended or adjusted under 35 U.S.C. 154(b) by 137 days.

(21) Appl. No.: 12/779,896

(22) Filed: May 13, 2010

(65) Prior Publication Data

US 2010/0293293 A1 Nov. 18, 2010

Related U.S. Application Data

(60) Provisional application No. 61/177,991, filed on May 13, 2009.

(51) Int. Cl.
| | |
|---|---|
| G06F 15/173 | (2006.01) |
| H04L 12/701 | (2013.01) |
| H04L 12/707 | (2013.01) |
| H04L 12/703 | (2013.01) |
| H04L 12/713 | (2013.01) |
| H04L 12/715 | (2013.01) |

(52) U.S. Cl.
CPC ............... *H04L 45/00* (2013.01); *H04L 45/22* (2013.01); *H04L 45/28* (2013.01); *H04L 45/586* (2013.01); *H04L 45/64* (2013.01)

(58) Field of Classification Search
CPC .... H04L 45/00; H04L 29/06; H04L 29/08072
USPC ................................. 709/203, 230, 231, 238
See application file for complete search history.

(56) References Cited

U.S. PATENT DOCUMENTS

| | | | |
|---|---|---|---|
| 5,488,608 | A | 1/1996 | Flammer, III |
| 6,259,699 | B1 | 7/2001 | Opalka et al. |
| 6,600,744 | B1 | 7/2003 | Carr et al. |
| 6,754,188 | B1 | 6/2004 | Garahi et al. |

(Continued)

FOREIGN PATENT DOCUMENTS

| | | |
|---|---|---|
| CN | 1987798 | 6/2007 |
| EP | 1793542 | 6/2007 |

(Continued)

OTHER PUBLICATIONS

PCT Search Report and Written Opinion mailed Jul. 24, 2009 from International Application No. PCT/US2009/045526 filed May 28, 2009.

(Continued)

*Primary Examiner* — Philip Chea
*Assistant Examiner* — Van Kim T Nguyen
(74) *Attorney, Agent, or Firm* — Sheppard, Mullin, Richter & Hampton LLP

(57) ABSTRACT

Systems and methods for fractional routing are described. An exemplary method may include receiving, by a first router, data information regarding routing by a first portion of a third router, receiving, by a second router, data information regarding routing by a second portion of a third router, wherein the data information regarding routing by the first portion and data information regarding routing by the second portion is not the same, routing, by the first router, data associated with the routing by the first portion of the third router, and routing by the second router, data associated with the routing by the second portion of the third router.

30 Claims, 19 Drawing Sheets

(56) References Cited

U.S. PATENT DOCUMENTS

| | | | |
|---|---|---|---|
| 6,760,766 B1 * | 7/2004 | Sahlqvist | 709/227 |
| 6,763,018 B1 | 7/2004 | Puthiyandyil et al. | |
| 7,120,152 B2 | 10/2006 | Park | |
| 7,317,731 B2 | 1/2008 | Seddigh et al. | |
| 7,318,179 B1 | 1/2008 | Fernandes et al. | |
| 7,349,979 B1 * | 3/2008 | Cieslak et al. | 709/238 |
| 7,467,229 B1 | 12/2008 | Biggs et al. | |
| 7,684,794 B1 | 3/2010 | Leung et al. | |
| 7,694,012 B1 * | 4/2010 | Harper et al. | 709/238 |
| 7,707,305 B2 * | 4/2010 | Afek et al. | 709/238 |
| 7,783,779 B1 * | 8/2010 | Scales et al. | 709/240 |
| 7,802,010 B1 * | 9/2010 | Oehrke | 709/238 |
| 7,912,981 B2 * | 3/2011 | May et al. | 709/238 |
| 7,996,460 B1 * | 8/2011 | Arsenault | 709/203 |
| 8,020,200 B1 * | 9/2011 | Krohn et al. | 726/11 |
| 8,139,588 B2 * | 3/2012 | Hardjono et al. | 370/400 |
| 2002/0103921 A1 | 8/2002 | Nair et al. | |
| 2004/0156345 A1 | 8/2004 | Steer et al. | |
| 2004/0264379 A1 | 12/2004 | Srikrishna et al. | |
| 2005/0076231 A1 | 4/2005 | Ichinohe et al. | |
| 2005/0094620 A1 | 5/2005 | Calcev | |
| 2006/0120342 A1 * | 6/2006 | Christensen et al. | 370/351 |
| 2006/0203719 A1 | 9/2006 | Kim et al. | |
| 2007/0019642 A1 | 1/2007 | Lu et al. | |
| 2007/0058638 A1 | 3/2007 | Guichard et al. | |
| 2007/0156919 A1 | 7/2007 | Potti et al. | |
| 2007/0189158 A1 | 8/2007 | Kulmala et al. | |
| 2007/0189191 A1 | 8/2007 | Ades | |
| 2007/0207806 A1 | 9/2007 | Shaheen | |
| 2007/0263554 A1 | 11/2007 | Finn | |
| 2007/0291686 A1 | 12/2007 | Fiat | |
| 2008/0107060 A1 | 5/2008 | Andou et al. | |
| 2008/0144513 A1 | 6/2008 | Small et al. | |
| 2008/0151917 A1 | 6/2008 | Bartlett et al. | |
| 2008/0232272 A1 | 9/2008 | Gelbman et al. | |
| 2008/0259555 A1 | 10/2008 | Bechtolsheim et al. | |
| 2008/0259889 A1 | 10/2008 | Wu | |
| 2009/0219850 A1 | 9/2009 | Lin et al. | |
| 2009/0262642 A1 | 10/2009 | Van Greunen et al. | |
| 2009/0304007 A1 | 12/2009 | Tanaka et al. | |
| 2009/0310582 A1 | 12/2009 | Beser | |
| 2010/0020753 A1 | 1/2010 | Fulknier et al. | |
| 2010/0049969 A1 | 2/2010 | Shon | |
| 2010/0067462 A1 | 3/2010 | Beser et al. | |
| 2010/0098094 A1 * | 4/2010 | Jounay et al. | 370/401 |
| 2010/0149988 A1 | 6/2010 | Matsubara et al. | |
| 2010/0228961 A1 * | 9/2010 | Burns et al. | 713/150 |
| 2010/0302989 A1 | 12/2010 | Sung et al. | |
| 2011/0103279 A1 | 5/2011 | Srinivasan et al. | |
| 2012/0207116 A1 | 8/2012 | Chen et al. | |
| 2012/0290699 A1 | 11/2012 | Zhang et al. | |

FOREIGN PATENT DOCUMENTS

| | | |
|---|---|---|
| EP | 1921794 | 5/2008 |
| WO | 0023898 | 4/2000 |
| WO | 2007133786 | 11/2007 |

OTHER PUBLICATIONS

PCT Search Report and Written Opinion mailed Jul. 7, 2009 from International Application No. PCT/US2009/044191 filed May 15, 2009.

Antti Makelainen, Analysis of Handoff Performance in Mobile WiMAX Networks, Thesis for Master of Science in Engineering, Helsinki University of Technology (Dec. 3, 2007) (Mar. 12, 2007) [Retrieved from t<URL:http://lib.tkk.fi/dipl/2007/urn010154.pdf] entire document.

PCT Search Report and Written Opinion mailed Jul. 8, 2010 from International Application No. PCT/US2010/034810 filed May 13, 2010.

International Application No. PCT/US2011/053969, International Search Report and Written Opinion mailed Jan. 20, 2012.

European Patent Application No. 09755744.1, Search Report mailed Feb. 6, 2013.

European Patent Application No. 09747706.1, Search Report mailed Sep. 9, 2013.

European Patent Application No. 10775571.2, Search Report mailed Sep. 11, 2013.

European Patent Application No. 11833109.9, Partial Search Report mailed Feb. 16, 2015.

* cited by examiner

SYSTEMS AND METHODS FOR FRACTIONAL ROUTING REDUNDANCY

CROSS-REFERENCE TO RELATED APPLICATION

The present application claims priority benefit to U.S. Provisional Patent Application No. 61/177,991, filed May 13, 2009, entitled "WSG Multicast Support and Redundant Routing Architecture" which is incorporated by reference herein. This application also incorporates by reference U.S. Nonprovisional patent application Ser. No. 12/474,231, filed May 28, 2009, entitled "Systems and Methods for Data Path Control in a Wireless Network" which is a continuation-in-part of U.S. Nonprovisional patent application Ser. No. 12/466,998, filed May 15, 2009, entitled "Systems and Methods for Distributed Data Routing in a Wireless Network" which claims benefit and priority of U.S. Provisional Patent Application No. 61/053,611, filed May 15, 2008, entitled "ASN and CSN Architecture" and priority of U.S. Provisional Patent Application No. 61/056,751, filed May 28, 2008, entitled "ASNS Data Path Controller" which are all incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to routing data. More particularly, the invention relates to systems and methods for fractional routing redundancy.

2. Description of Related Art

WiMax (Worldwide Interoperability for Microwave Access) is a wireless broadband technology, which supports point to multi-point (PMP) broadband wireless access. WiMAX™ is based upon the IEEE 802.16 standard enabling the delivery of wireless broadband services. WiMAX products can accommodate fixed and mobile usage models. The IEEE 802.16 standard was developed to deliver non-line-of-sight (LoS) connectivity between a subscriber station and base station with typical cell radius of three to ten kilometers.

All base stations and subscriber stations claiming to be WiMAX compliant must go through a rigorous WiMAX Forum Certified™ testing process. WiMAX Forum Certified systems can be expected to deliver capacity of up to 40 Mbps per channel. This is enough bandwidth to simultaneously support hundreds of businesses with T-1 speed connectivity and thousands of residences with DSL speed connectivity. The WiMAX Forum expects mobile network deployments to provide up to 15 Mbps of capacity within a typical cell radius of up to three kilometers. WiMAX technology already has been incorporated in notebook computers and PDAs to deliver high speed mobile Internet services.

One of the advantages of WiMAX technology is the use of Orthogonal Frequency-Division Multiplexing (OFDM) over Edge, GPRS, or HSPA to deliver higher bandwidth efficiency, and, therefore, higher data throughput, with more than one Mbps downstream and higher data rates. Adaptive modulation also increases link reliability for carrier-class operation and the possibility to keep higher order modulation at wider distance extend full capacity over longer distances.

OFDM is a digital encoding and modulation technology. It has been used successfully in wire-line access applications, such as Digital Subscriber Line (DSL) modems and cable modems as well as WiFi. Products from WiMAX Forum member companies often use OFDM-based 802.16 systems to overcome the challenges of non-line-of-sight (NLoS) propagation. OFDM achieves high data rate and efficiency by using multiple overlapping carrier signals instead of just one. All future technologies for 4G will be based upon OFDM technology.

Orthogonal Frequency Division Multiple Access (OFDMA) is enhanced OFDM and is used in Mobile WiMAX technology and the IEEE 802.16e-2005 standard. It is a multi-user version of Orthogonal Frequency-Division Multiplexing (OFDM). The difference between the two technologies is that OFDMA assigns subsets of sub-carriers to individual users allowing simultaneous low data rate transmission from several users.

Regardless of the standard, as networks become more complex, information is routed from source to destination. Multiple routers may work together to bring data (e.g., telephone calls, video, or any data stream) to a user. In order to safeguard the flow of data, it is not uncommon for a router to have one or more back-up routers. For example, if a primary router goes down (e.g., due to power loss or hardware failure) a secondary or standby router may be activated whereby the standby router handles the data routing for the failed primary router.

Unfortunately, the standby router is often located in the same geographic location (i.e., geolocation) as the primary router. As a result, if the primary router is down due to a natural disaster or loss of power at the facility, then the standby router would likely also be down. Further, the standby router is required to be an exact duplicate of the primary router and the two routers are required to synchronize data flows in case of failure. As a result, synchronization between the two routers may require constant communication.

SUMMARY

In various embodiments, the data plane may be abstracted from a control plane in a wireless network such as WiMax, WiFi, LTE or the like. In some embodiments, a routing device comprises a control module, a service module, and a router module. The control module may be configured to receive communication instructions from a control server. The service module may be configured to process the communication instructions and provide data path instructions based on the communication instructions. The router module may be configured to receive data from a source device and route the processed data to a target device based on the data path instructions. The control server may comprise a WiMax server such as an ASN server, LTE server, or CSN server. In one example, the control server comprises the ASN server and the routing device communicates with the ASN server over an R7 inteface.

In some embodiments, the communication instructions comprise instructions to tunnel the received data using one of a plurality of GRE tunnels. The communication instructions may comprise instructions to tunnel the received data using one of a plurality of IP tunnels.

A base station may comprise the routing device. In some embodiments, the communication instructions comprise instructions to tunnel the received data using one of a plurality of IP tunnels and wherein the target device comprises a CSN server. Alternately, the communication instructions may comprise instructions to process the received data using a VLAN protocol. The CSN server may comprise the routing device.

In various embodiments, a method comprises receiving communication instructions from a control server, receiving data from a source device, processing the data based on the communication instructions, and routing the processed data to a target device.

A system may comprise a means for receiving communication instructions from a control server and receiving data from a source device, means for processing the data based on the communication instructions, and a means for routing the processed data to a target device.

A computer readable medium may comprise instructions. The instructions may be executable by a processor to perform a method. The method may comprise receiving communication instructions from a control server, receiving data from a source device, processing the data based on the communication instructions, and routing the processed data to a target device.

In various embodiments, the data plane may be abstracted from a control plane in a wireless network such as WiMax, WiFi, LTE or the like. In some embodiments, a method comprises a receiving control data at a network device from a source device, generating routing instructions at a network device regarding routing network data based on the control data instructions, providing the routing instructions to a routing device, configuring the routing device based on the routing instructions, receiving network data from the source device, and routing the network data from the source device to a target device using the configured routing device.

The network device may comprise a WiMAX server or an LTE server. In some embodiments, the network device is an access server network (ASN) server and providing the routing instructions comprises providing the routing instructions from the ASN server over an R7 interface to the routing device.

In various embodiments, the routing instructions may comprise instructions to forward matching incoming traffic arriving on a specific ingress interface to a specific egress interface. The ingress interface may comprise a specific generic routing encapsulation (GRE) tunnel and the egress interface may comprise an IP to IP tunnel.

The routing instructions may comprise instructions to drop matching incoming traffic arriving on a specific ingress interface, instructions to duplicating outgoing traffic to two or more egress interfaces, and/or instructions to buffer packets at an egress interface according to hierarchical quality of service (QoS) policies.

The method may further comprise matching network data using packet classification rules to determine a routing function.

In various embodiments, a system may comprise a network device and a routing device. The network device may be configured to receive control data from a source device, generate routing instructions regarding routing network data based on the control data instructions, and provide the routing instructions to a routing device. The routing device may be configured based on the routing instructions to receive network data from the source device, and route the network data from the source device to a target device based on the routing instructions.

A computer readable medium may comprise instructions. The instructions may be executable by a processor to perform a method. The method may comprise receiving control data at a network device from a source device, generating routing instructions at a network device regarding routing network data based on the control data, providing the routing instructions to a routing device, configuring the routing device based on the routing instructions, receiving network data from the source device, and routing the network data from the source device to a target device using the configured routing device.

An exemplary method may comprise receiving, by a first router, data information regarding routing by a first portion of a third router, receiving, by a second router, data information regarding routing by a second portion of a third router, wherein the data information regarding routing by the first portion and data information regarding routing by the second portion is not the same, routing, by the first router, data associated with the routing by the first portion of the third router, and routing by the second router, data associated with the routing by the second portion of the third router.

In some embodiments, wherein the data information regarding routing by the first portion of the third router comprises data information associated with a data stream being routed by the first portion and the data information regarding routing by the second portion of the third router comprises data information associated with a data stream being routed by the second portion. The method may further comprise receiving, by the first router and the second router, state information of the third router.

The method may comprise, in some embodiments, determining that the third router is not functional. The determination that the third router is not functional may be based, at least in part, on the state information.

The first portion of the third router may be a blade. The first router may be configured to back-up the first portion of the third router. The second router may be configured to back-up the second portion of the third router. Further, in some embodiments, at least a portion of the second router may be configured to back-up both the second portion of the third router and another portion of the second router.

In some embodiments, the method may further comprise receiving, by a fourth router, data information regarding routing by the first portion and data information regarding routing by the second portion. The fourth router may provide redundancy routing services, at least in part, both the first router and the second router.

The method may further comprise redirecting data associated with the routing by the first portion of the third router to the first router and redirecting data associated with the routing by the second portion of the third router to the second router.

An exemplary system may comprise a first, second, and third router. The first router may be configured to receive data information regarding routing by a first portion of a third router and to route data associated with the routing by the first portion of the third router. The second router may be configured to receive data information regarding routing by a second portion of a third router and to route data associated with the routing by the second portion of the third router. The data information regarding routing by the first portion and data information regarding routing by the second portion may not be the same. The third router may comprise the first and second portions.

An exemplary system may comprise a first, second, and third routing means. The first routing means may be configured to receive data information regarding routing by a first portion of a third routing means and to route data associated with the routing by the first portion of the third routing means. The second routing means may be configured to receive data information regarding routing by a second portion of a third routing means and to route data associated with the routing by the second portion of the third routing means, wherein the data information regarding routing by the first portion and data information regarding routing by the second portion is not the same. The third routing means may comprise the first and second portions

DETAILED DESCRIPTION OF THE INVENTION

In various embodiments, the data plane may be abstracted from a control plane in a wireless network such as WiMax, WiFi, LTE or the like. Data plane (i.e., forwarding plane) functions, although controlled through communications from the control plane, may be performed on a separate device. The device performing the data plane functions may be completely ignorant of the nature of the data being routed. As a result, the data plane device may be used by different wireless network servers utilizing different architectures.

For example, in a WiMax architecture, access service network (ASN) data plane functions may be performed by a routing device rather than an access service network server (ASN server). Together, the routing device and the ASN server may comprise an ASN gateway. The routing device, however, may be agnostic of the ASN server. As a result, the ASN server may be replaced by any wireless network server (e.g., for a WiFi or LTE architecture) and continue to work with the digital device to perform data path functions. Alternately, the routing device may be replaced with another routing device that performs routing in a different manner, however, the ASN server (e.g., without reconfiguration) and the new routing device may still perform the function of the ASN gateway.

In various embodiments, the rest of the wireless network devices (apart from the ASN server and the routing device) will not need to be reconfigured or altered even though the ASN server may be performing control plane functions and the routing device may be performing data plane functions. In other words, from the perspective of base stations (BSs), other ASNs, or a connectivity service network (CSN), the ASN server paired with the routing device may appear and perform as a typical ASN gateway.

In some embodiments, a decentralized data path as described herein is simpler in implementation than an integrated data path (e.g., the integrated data path products tend to be complex products which leads to costly systems that may be buggy). For example, traditional ASN and/or CSN servers tend to perform both control plane and data plane functions. However, in some embodiments, the routing device comprising an off-the-shelf router (e.g., Juniper MX or M series router) may perform the data plane functions thereby simplifying the function of the ASN server. By simplifying the function of the ASN and/or CSN server, the ASN and/or CSN server may be less expensive and more reliable.

Figure 1:
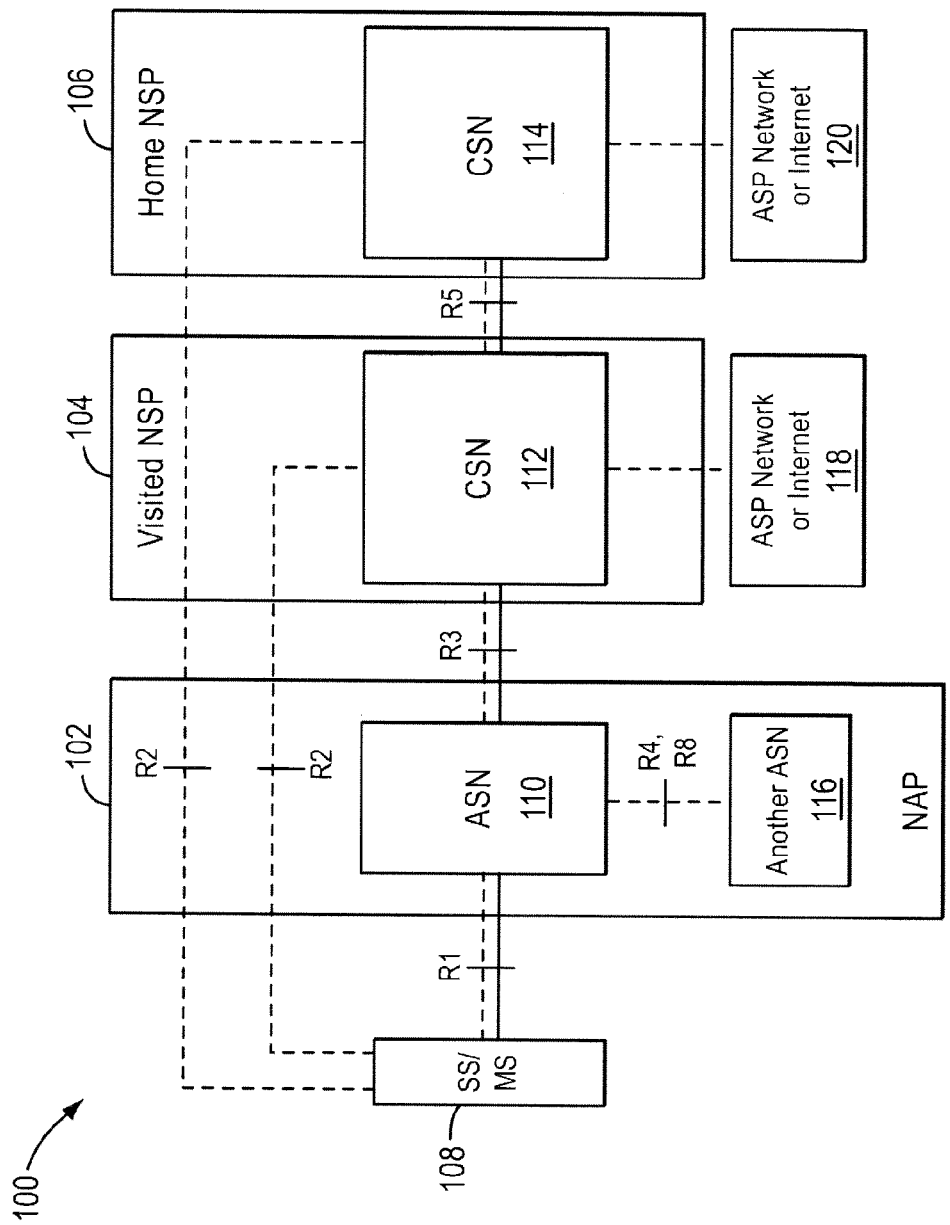
FIG. 1 illustrates an example of a centralized architecture of a WiMax or 802.16e system in the prior art.

FIG. 1 illustrates an example of a centralized architecture of a WiMax or 802.16e system in the prior art. FIG. 1 illustrates a WiMAX Network Reference Model (NRM) 100 comprising the following logical entities: subscriber station/mobile station (SS/MS) 108, a network access provider (NAP) 102, a visited network service provider (visited NSP) 104, and a home network service provider (home NSP) 106. The NAP 102 comprises an access server network (ASN) 110 and another ASN 116. The visited NSP 104 comprises a connectivity service network (CSN) 112. The home NSP 106 comprises CSN 114.

The figure depicts normative reference points R1-R5. Each of the entities, SS/MS 108, ASN 110 and 116, and CSN 112 and 114 represent a grouping of functional entities. Each of these functions may be realized in a single physical device or may be distributed over multiple physical devices. The grouping and distribution of functions into physical devices within a functional entity (such as the ASN 110) is an implementation choice; a manufacturer may choose any physical implementation of functions, either individually or in combination, as long as the implementation meets the functional and interoperability requirements.

As shown, CSN 114 communicates with (transfers data to and receives data from) a network such as the Internet (e.g., application service provider (ASP) network or Internet 120). Similarly, the CSN 112 may also communication with the ASP network or Internet 118. Further, the CSN 112 and/or 114 communicates with one or more ASNs such as ASN 110. The ASN 110 communicates with another ASN 116. Each ASN may include an ASN-GW (ASN gateway) and a plurality of base stations (BSs) not depicted. The ASN gateway may comprise an ASN server which is in communication with CSN 112 over an interface (e.g., an R3 interface). The ASN gateway also communicates with one or more base stations (BSs) over respective interfaces (e.g., R6). Each BS serves the communication needs of mobile stations (MS) or subscriber stations (SSs) within a coverage area.

A BS communicates with one or more mobile stations over an air-interface governed by, for example, an R1 protocol or R1 interface. The R1 interface is between the SS/MS 108 and the ASN 110 as per the air-interface (PHY and MAC) specifications (IEEE P802.16d/e). R1 may include additional protocols related to the management plane.

Furthermore, BS in different ASNs may directly communicate with one another over respective interfaces (e.g., R8 interfaces). Additional functions that may be a part of the BS may include (but are not limited to) micromobility management functions, such as handoff riggering and tunnel establishment, radio resource management, QoS policy enforcement, traffic classification, DHCP (Dynamic Host Control Protocol) proxy, key management, session management, and multicast group management.

The ASN gateway may be configured to act as a layer 2 traffic aggregation point within an ASN 110. The ASN server communicates with the CSN 112 over an R3 interface. The R3 interface is the interface between the ASN 110 and the CSN 112 to support AAA, policy enforcement and mobility management capabilities. It also encompasses the bearer plane methods (e.g., tunneling) to transfer IP data between the ASN 110 and the CSN 112.

Additional functions of the ASN server may include, but are not limited to, intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN.

The ASN server may also communicate with another ASN 116 over an R4 interface. The R4 interface consists of a set of control and bearer plane protocols originating/terminating in various entities within the ASN 110 that coordinate MS mobility between ASNs. In Release 1, R4 is the only interoperable interface between heterogeneous or dissimilar ASNs.

In operation, the CSN 112 and/or 114 may operate as the home agent (HA) and may also provide the authentication, authorization and accounting functions (AAA server). As shown, the CSN 112 may also communicate with the SS/MS 108 via an R2 interface. The R2 interface between the SS/MS 108 and CSN 112 and/or CSN 114 is associated with authentication, services authorization, IP Host Configuration management, and mobility management. This is a logical interface thus may not reflect a direct protocol interface between SS/MS 108 and CSN 112 or CSN 114. The ASN gateway may operate as the gateway for routing data to the respective base stations among other things, and the base stations handle the communication needs of the mobile stations (e.g., SS/MS 108).

The CSN 112 may also communicate with another CSN 114 over an R5 interface. The R5 interface consists of a set of control plane and bearer plane protocols for internetworking between CSNs operated by either the home or visited NSP.

The CSN 112 may be configured to provide connectivity to the Internet, ASP, other public networks and corporate networks. The CSN 112 may be owned by the NSP and include AAA servers that support authentication for the devices, users, and specific services. The CSN 112 may also provider per user management of QoS and security. The CSN 112 may be responsible for IP address management, support for roaming between different NSPs, location management between ASNs, and mobility and roaming between ASNs. Further, CSN 112 can also provide gateways and interworking with other networks, such as PSTN (public switched telephone network), 3GPP, and 3GPP2. Those skilled in the art will appreciate that the CSN 112 and the CSN 114 may perform similar features.

Figure 2:
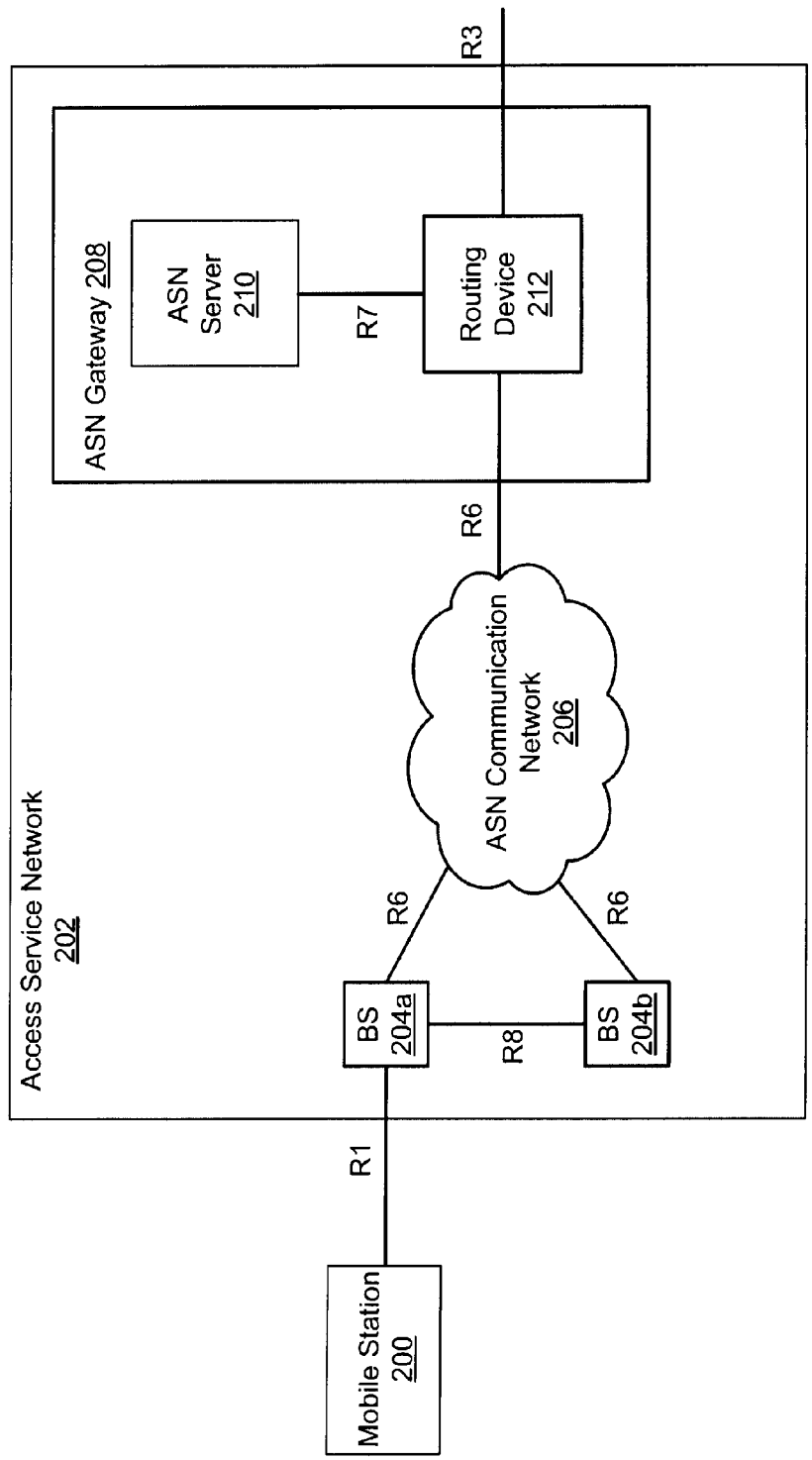
FIG. 2 is a block diagram of an exemplary access service network.

FIG. 2 is a block diagram of an exemplary access service network (ASN) 202. In various embodiments, the traditional functions of an ASN server may be separated between control and data path processing. The data path processing may be performed by a routing device. When paired, the ASN router and the routing device may comprise a seamless ASN gateway.

A mobile station (MS) 200 (e.g., a digital device such as a computer, smartphone, PDA, music player, ebook reader, or media player) communicates with the ASN 202. In one example, the MS 200 communicates with the Internet over the ASN 202. The MS 200 may communicate with the BS 204*a* over RF or any frequency range.

The ASN 202 comprises BS 204*a* and 204*b*, an ASN communication network 206, and an ASN gateway 208. The ASN gateway 208 comprises an ASN server 210 and a routing device 212. The BS 204*a* may also communicate with the ASN gateway 208 over an R6 interface. The R6 interface consists of a set of control and bearer plane protocols for communication between the BS 204*a* and the ASN gateway 208. The bearer plane consists of intra-ASN data path or inter-ASN tunnels between the BS and ASN gateway 208. The control plane includes protocols for IP tunnel management (establish, modify, and release) in accordance with the MS mobility events. R6 may also serve as a conduit for exchange of MAC states information between neighboring BSs.

The BS 204*a* may communicate with another BS (e.g., BS 204*b*) over an R8 interface. The R8 interface consists of a set of control plane message flows and, in some situations, bearer plane data flows between the base stations to ensure fast and seamless handover. The bearer plane consists of protocols that allow the data transfer between base stations involved in handover of a certain mobile station. The control plane consists of the inter-BS communication protocol defined in IEEE 802.16 and additional set of protocols that allow controlling the data transfer between the Base Stations involved in handover of a certain mobile station.

The BS 204*a* is any communication device configured to communicate with the MS 200 (e.g., via RF) thereby creating a service flow. The BS 204*a* may comprise a digital device. Data from the MS 200 is provided by the BS 204*a* to the ASN gateway 208. The service flow may be tunneled through a generic routing encapsulation (GRE) tunnel to the routing device 212. In one example, the GRE tunnel creates a virtual point-to-point link between the BS 204*a* and the routing device 212.

The ASN communication network 206 is any network that supports communication between the BS 204*a* and BS 204*b* with the ASN gateway 208. In some embodiments, the BS 204*a* may communicate with BS 204*b* via the ASN communication network 206. The ASN communication network 206 may support communication via R6 and/or R8 protocols.

The ASN server 210 performs control plane functions of the ASN gateway 208. As discussed herein, the ASN may support AAA, policy enforcement and mobility management capabilities. Additional functions of the ASN server may include, but are not limited to, intra-ASN location management and paging, radio resource management and admission control, caching of subscriber profiles and encryption keys, AAA client functionality, establishment and management of mobility tunnel with base stations, and QoS and policy enforcement.

The routing device 212, when paired with the ASN server 210, may comprise a full NWG compatible ASN gateway. The routing device 212 may comprises any digital device configured to route data and/or handle data path processing. In one example, the routing device 212 distributes data from the BS 204*a* to a CSN (not depicted). The ASN gateway 208 may be compliant to WiMax Forum Profile C which can be used to control non-Telsima BSs.

The routing device 212 may receive data from a source device (e.g., the MS 200 via the BS 204a) and provide the data to a target device (e.g., the CSN not depicted). The source device is any digital device that provides data that is received by the routing device 212. The target device is any digital device that receives the data that was provided by the source device via the routing device 212.

The routing device 212 may be configured to perform data path processing. In one example, routing device 212 maybe configured to generate (or assist in generating) a generic route encapsulation (GRE) tunnel per service flow between the routing device 212 and the BS 204a and encapsulate downlink traffic along with IP security (IPsec). The GRE maximum packet size is 1500 bytes. As a result, the maximum packet size may be set as 1400 bytes. The routing device 212 may be configured to process the nonstandard packet size when routing data between the BS 204a and the CSN.

Further, the routing device 212 may be configured to tunnel data received from the GRE tunnel to the CSN. For example, the routing device 212 may tunnel data using an IP tunnel (via the Mobile IP protocol) to provide data received from the GRE tunnel to provide the data to the CSN.

The routing device 212 may be configured to communicate with the ASN server 210 over an R7 interface. The R7 interface represents internal communication within the gateway and may carry control signals. In one example, communication instructions from the ASN server 210 are received from the routing device 212. Communication instructions comprise instructions to carry out data path functions. In one example, communication instructions indicate that data is to be received from a specific GRE tunnel data. Similarly, communication instructions may indicate that data is to be provided to a specific IP tunnel in order to transmit the data to the CSN (not depicted) via the R3 interface. Further, the communication instructions may indicate that data is to be received from a specific IP tunnel data and forwarded to a specific GRE tunnel.

Figure 3:
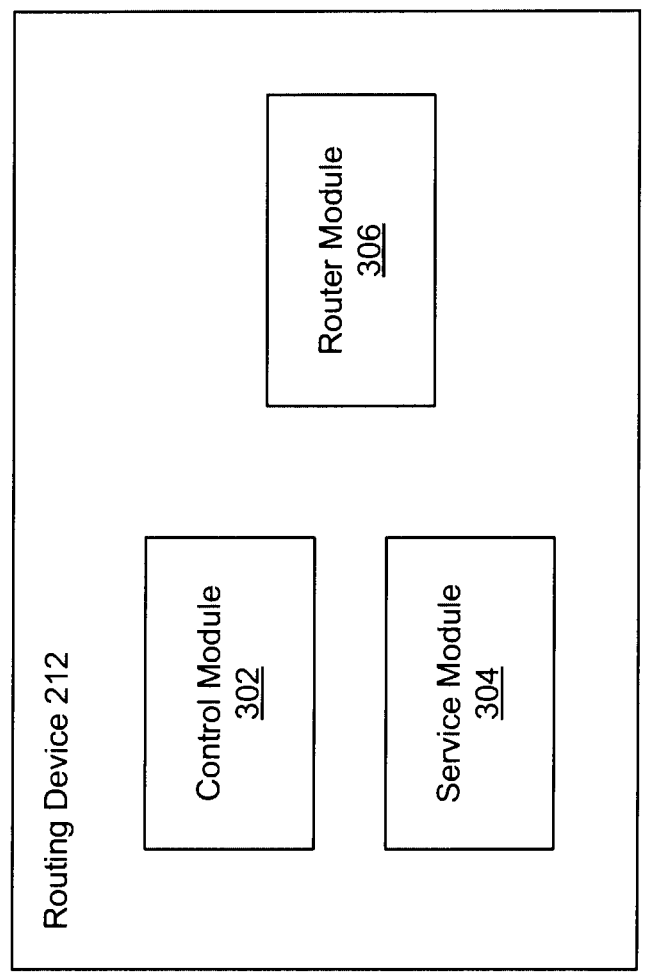
FIG. 3 is a block diagram of an exemplary routing device.

FIG. 3 is a block diagram of an exemplary routing device 212. The routing device 212 may be configured to perform data path functions for any number of wireless networks. In some embodiments, the exemplary routing device 212 comprises a control module 302, a service module 304, and a router module 306. The control module 302 is configured to receive communication instructions from a server such as the ASN server (not depicted).

The service module 304 is configured to instruct the router module 306 based on the communication instructions from the control module 302. In one example, the service module 304 processes communication instructions from the control module 302 and provides data path instructions based on the communication instructions to the router module 306. In alternate some embodiments, some or all of the communication instructions may be provided to the router module 306.

The router module 306 may comprise a router such as Juniper MX series router or an M series router. In various embodiments, the router module 306 receives data path instructions from the service module 304. For example, the router module 306 may unpack data from a specific GRE tunnel based on the instructions and provide the data to a target device.

In some embodiments, a GRE tunnel numbering scheme is determined between a negotiation between a base station and an ASN server. The control module 302 may receive communication instructions which indicate which GRE tunnel is to be used in the data path services. The service module 304 may then provide the router instructions (i.e., data path instructions) that the router must retrieve data from the specified GRE tunnel.

In other examples, the service module 304 provides instructions to the router module 306 to unpack the data from the specific GRE tunnel. The instructions may comprise some or all of the communication instructions. The service module 304 may also provide instructions to pack the data in an IP tunnel to route the data to the CNS. Alternately, the service module 304 may provide instructions to the router module 306 to unpack data from a specific IP tunnel and transmit the data through a specific GRE tunnel. The routing device 212 may further tag service flows with VLAN information for VLAN tunnel implementation.

Those skilled in the art will appreciate that, in some embodiments, the router of the router module 306 may be replaced or updated to take advantage of new functionality of a new router (e.g., a new off-the-shelf router). In some embodiments, no further changes may be made to the routing device 212 or the ASN server. In other embodiments, the types of instructions of the communication instructions may change or expand. The routing device 212 and/or the wireless server (e.g., ASN server) may be configured to provide new communication instructions to take advantage of new functionality or services. In one example, communication instructions may indicate a different tunnel may be used (rather than a GRE or IP tunnel) or a different routing technology may be implemented.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

In various embodiments, the routing device 212 may be configured to support WSG multicast. In one example, Internet Group Management Protocol (IGMP) Join packets are received by the routing device 212 via GRE tunnels that carry unicast SF. The router module 306 (e.g., via an IGMP/PIM module not depicted) processes the IGMP request per standards. The ASN server (or ASN controller) may decide what can join which flow via communication control instructions received by the control module 302. If this is the first join request, the router module 306 may add an interface to a multicast packet duplication process. The multicast data may be tagged by many means (e.g., VLAN, GRE, or MPLS). A BS may receive VLAN data as if VLAN's are GRE tunnels and put them into multicast-SF.

Those skilled in the art will appreciate that IPTV may be supported through the WSG multicast mechanism. In various embodiments, each channel is a specific multicast-SF on RF downlink which may be connected to a specific VLAN tag. A set-top box may be configured to send an IGMP message every time a channel is changed. The set-top box may be further configured to go to the multicast-sf to get the data. If someone else is already viewing the channel, the video stream may already be on that specific data stream. If no-one is subscribed, the routing device 212 may start to send the data stream using the specific VLAN tag. The BS may receive the data packets through the VLAN tag and send the data packets to the connected multicast-SF. VLAN is further discussed in U.S. Nonprovisional application Ser. No. 11/748,476, filed May 14, 2007, entitled "Dynamic VLANS in Wireless Networks" which is hereby incorporated by reference.

Figure 4:
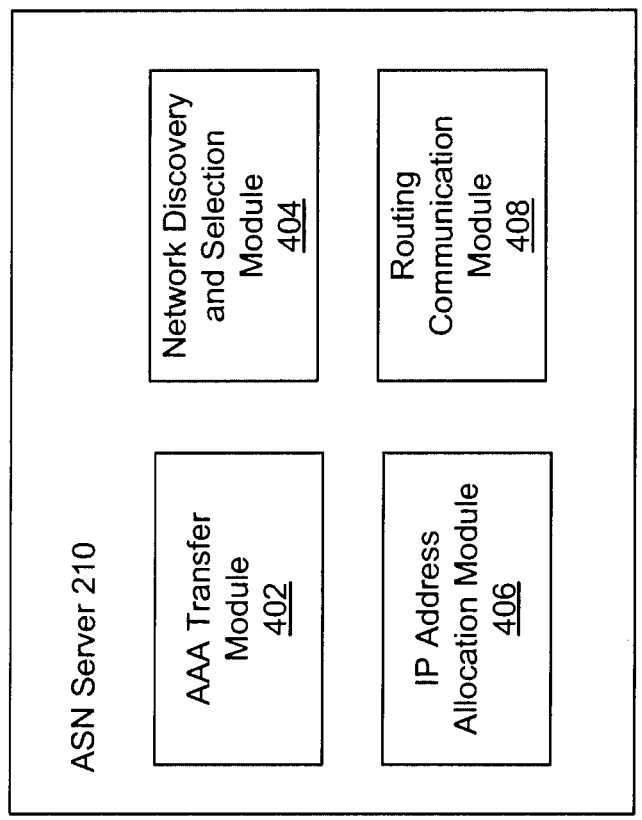
FIG. 4 is a block diagram of an exemplary ASN server.

FIG. 4 is a block diagram of an exemplary ASN server 210. As discussed herein, unlike ASN servers in the prior art, the data plane (e.g., forwarding plane) is abstracted from the control plane. As such, the ASN server 210 is configured to generate control plane messaging (e.g., communication instructions or IP service messages) which provide instructions to a routing device 212 (see FIG. 3) to perform data plane functions. As a result of the abstraction, the ASN server 210 may not perform any data plane functions (e.g., retrieving data from a GRE tunnel or transmitting data over a GRE or IP tunnel). Rather, the ASN server 210 may control those functions performed elsewhere. The ASN server 210, as a result, does not have to be configured to unpack data or to be concerned with the actual routing of packets.

The ASN server 210 may comprise an AAA transfer module 402, a network discovery and selection module 404, an IP address allocation module 406, and the routing communication module 408. The AAA transfer module 402 performs, independent of mobility mode, the transfer of AAA control messages to WiMax subscriber's Home Network Service Provider (H-NSP) for authentication, authorization, and session accounting for subscriber sessions.

The network discovery and selection module 404 performs network discovery and selection of an appropriate network service provider (NSP) that a WiMax subscriber accessess WiMax Servic(es). The IP address allocation module 406 manages Layer-3 (L3) connectivity established with a stationary subscriber or mobile subscriber (SS/MS).

The routing communication module 408 may generate and provide communication instructions to a routing device 212. Since the data plane is abstracted from the control plane, the functions of the data plane are controlled via the routing communication module 408. In some examples, the routing communication module 408 may generate communication instructions that indicate which GRE tunnel data is to be received and which IP tunnel data is to be provided. The communication instructions may be provided to the routing device 212.

In one example, the BS tunnels data received from a mobile station (MS) within an appropriate GRE tunnel. The BS and/or MS may provide control data which is received by the ASN server 210. The routing communication module 408 may receive the control data and instruct the routing device 212 to retrieve the data from the correct GRE tunnel. For example, the control module 302 of the routing device 212 may receive the instructions from the communication module 408 of the ASN server 210. The router module 306 may then retrieve the data from the correct GRE tunnel and provide the data to the target device. In some embodiments, the router module 306 may tunnel the data within an IP tunnel to the CSN as further instructed by the routing communication module 408 of the ASN server 210. For example, the ASN server 210 may control ASN/CSN tunneling and intra-ASN mobility. The ASN server 210 may also perform paging and location management. Depending on the configuration, the ASN server may also provide radio resource management as well.

The ASN server 210 may be configured for applications such as VoIP and video broadcast. For session based applications such as VoIP, the full QoS and admission may be under the control of the provider. Further, the ASN server 210 may control the QoS levels on both RF and network layers. The ASN server 210 may be configured to control the VLAN usage either putting the VLAN tags for the customers by the BS or allow the customer to tag the traffic but police the VLAN tags.

Figure 5:
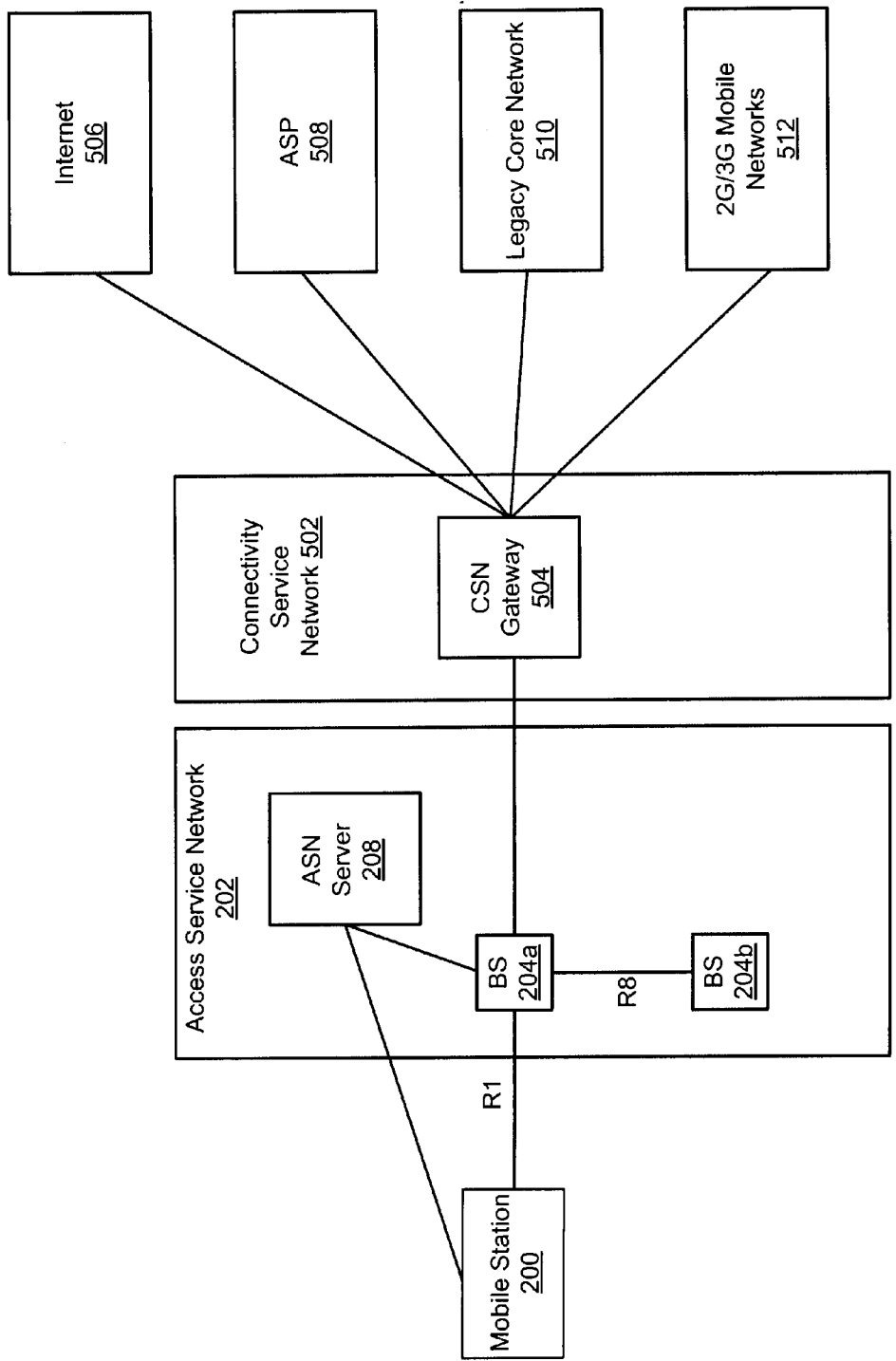
FIG. 5 is a block diagram of an exemplary WiMax network.

FIG. 5 is a block diagram of an exemplary WiMax network. In various embodiments, there is no ASN gateway, rather, the data path can be distributed through a base station (e.g., BS 204a). MS 200 sends and receives control messages directly with the ASN server 208 of the ASN 202. The MS 200 sends data to the BS 204a (via the R1 interface). The BS 204a, in addition to functions of the BS 204a described herein, may perform data path processing based on communication instructions received from the ASN server 208. In some embodiments, the BS 204a comprises a routing device such as routing device 212 (discussed herein).

The BS 204a may receive communication instructions from the ASN server 208 and data from the MS 200. In some embodiments, the data is to be provided to the CSN gateway 504 of the CSN 502. The communication instructions may instruct the BS 204a to tunnel the data from the MS 200 using an IP tunnel (via Mobile IP) to the CSN gateway 504. Alternately, the communication instructions may instruct the BS 204a to tunnel the data using a VLAN tunnel and/or provide the data to another base station (e.g., BS 204b). As instructed from the ASN server 208 via communication instructions, the routing device of the BS 204a may route accordingly.

The CSN gateway 504 may unpack the data from the IP tunnel and provide the data to the Internet 506, ASP 508, legacy core network 510, or 2G/3G Mobile network 512.

In various embodiments, one or more base stations may be reconfigured to perform routing functions or comprise a routing device 212. Those skilled in the art will appreciate that a wireless network may comprise a combination of base stations configured to perform data path functions via the routing device and unconfigured base stations. In one example, an unconfigured base station may transmit data to an ASN gateway via GRE tunneling. A configured base station, however, may perform the data path functions of the ASN gateway. As a result, data from the base station may be tunneled directly to the CSN gateway 504.

Figure 6:
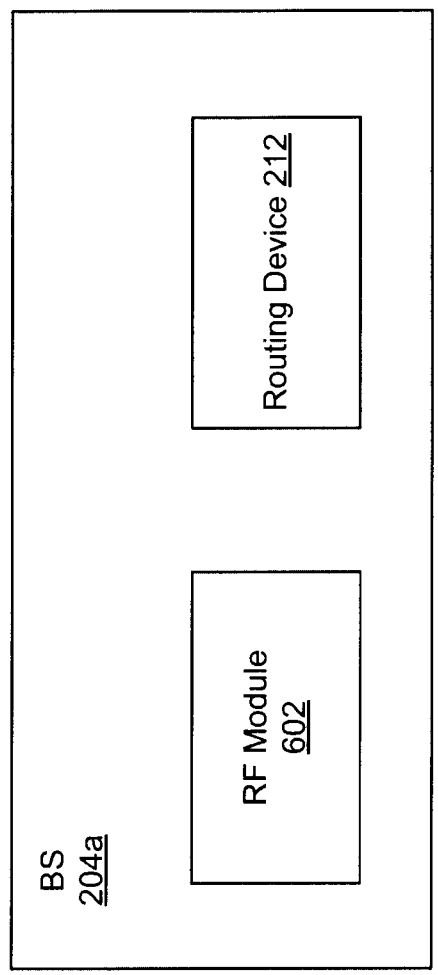
FIG. 6 is a block diagram of an exemplary base station.

FIG. 6 is a block diagram of an exemplary base station 204a. In various embodiments, there may not be any ASN gateway. In accordance with various embodiments described herein, the data plane may be abstracted to one or more base stations. As a result, the each base station may comprise the routing device 212 which receives communication instructions from the ASN server (not depicted) and routes data accordingly.

The base station 204a may comprise an RF module 602 and a routing device 212. The RF module 602 is configured to receive data from the SS/MS via RF. Although data is described as being received in RF, the data may be received by the BS 204a in any frequency.

Those skilled in the art will appreciate that the BS 204a may comprise any number of modules performing any number of functions. For example, a module may be configured to perform micromobility management functions, such as handoff riggering and tunnel establishment. One or more other modules may be configured to perform radio resource management, QoS policy enforcement, traffic classification, DHCP (Dynamic Host Control Protocol) proxy, key management, session management, and/or multicast group management.

Unlike some other embodiments described herein, each base station of a wireless network may require a routing device 212. In alternative embodiments, one or more base stations may be operably coupled to a routing device 212. The routing device 212 may receive communication instructions from the ASN server. Data may be provided to the routing device 212 "as is" or encapsulated to the routing device 212.

The routing device 212 may perform data path functionality in compliance with communication instructions as described herein.

Figure 7:
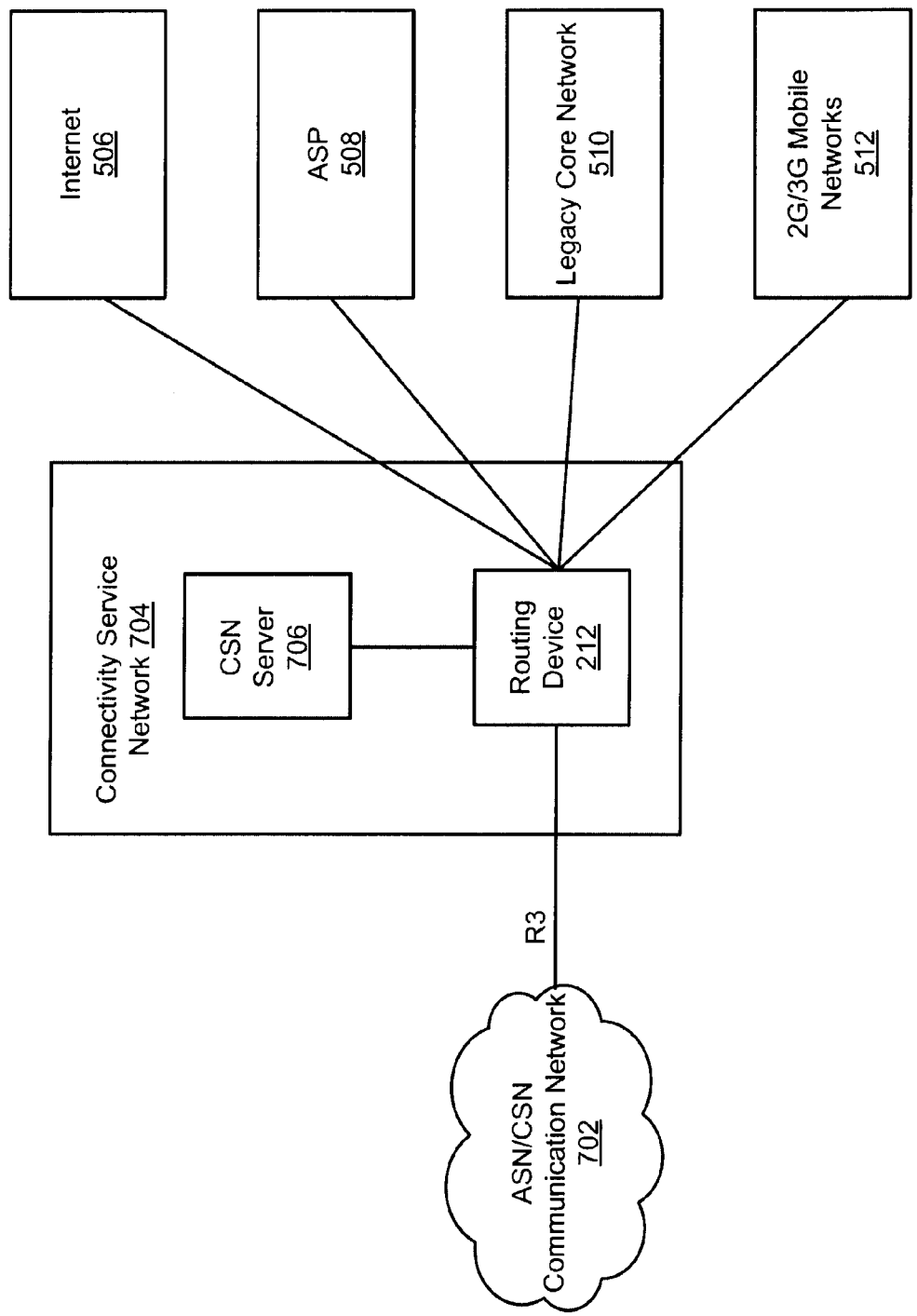
FIG. 7 is a block diagram of an exemplary connectivity service network.

FIG. 7 is a block diagram of an exemplary connectivity service network (CSN) 704. Similar to embodiments discussed herein, the control plane of the CSN may be abstracted from the data plane. In various embodiments, the same routing device 112 may be coupled to an ASN server or an CSN server without reconfiguration (see FIG. 8).

In various embodiments, the ASN/CSN communication network 702 is operably connected to the CSN 704. The CSN 704 comprises a CSN server 706 and a routing device 212. In some embodiments, when the CSN server 706 and the routing device 212 are paired, they comprise a CSN gateway. The routing device 212 is communicatively coupled with the Internet 506, the ASP 508, the legacy core network 510, and the 2G/3G mobile networks 512.

The CSN server 706 may comprise a routing communication module (not depicted). The routing communication module may generate and provide communication instructions to the routing device 212. Since the data plane is abstracted from the control plane, the functions of the data plane may be controlled via the routing communication module. In some examples, the routing communication module 408 may generate communication instructions that indicate that data is to be retrieved from a specific IP tunnel. Further, the routing communication module may instruct the routing device 212 where to route the data and if the data is to be further processes (e.g., tunneled).

Further, the CSN server 706 may be configured to perform control plane functions. In some examples, the CSN server 706 may operate as the home agent (HA) and may also provide the authentication, authorization and accounting functions (e.g., as an AAA server). The CSN server 706 may also be configured to perform Host Configuration management and mobility management. The CSN server 706 may also provider per user management of QoS and security. Further, CSN server 706 can also provide gateways and interworking with other networks, such as PSTN (public switched telephone network), 3GPP, and 3GPP2.

Figure 8:
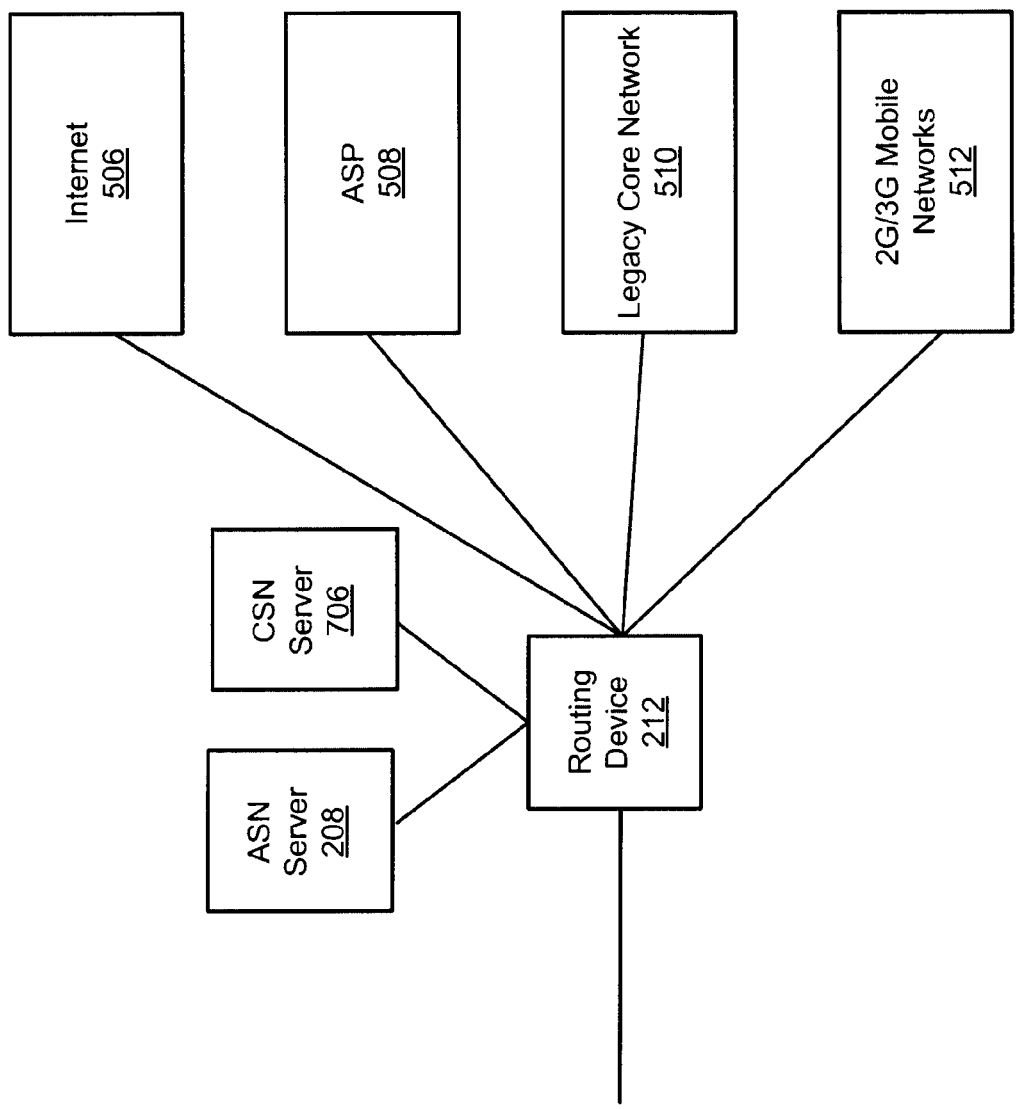
FIG. 8 is a block diagram of an ASN server and a CSN server operationally coupled to a routing device in some embodiments.

FIG. 8 is a block diagram of an ASN server 208 and a CSN server 706 operationally coupled to a routing device 212 in some embodiments. Due to data path abstraction, as described herein, the routing device 212 may receive communication instructions from any source (e.g., the ASN server 208 or CSN server 708) without further configuration. The routing device 212 may be agnostic as to the server that sends the communication instructions or why the communication instructions were generated. In some embodiments, one or more chassis may comprise the ASN server 208, the CSN server 706 and the routing device 212.

Those skilled in the art will appreciate that the ASN server 208 and the CSN server 706 may be in communication with the same routing device 212. In one example, the routing device 212 may retrieve data from a base station and/or mobile station from a GRE tunnel and provide the data "as is" (e.g., after unpacking the data from the GRE tunnel) to the Internet 506, the ASP 508, the legacy core network 510, and/or the 2G/3G mobile networks 512.

Since the CSN server 706 may be local to the routing device 212, the routing device 212 may need not tunnel the received data in an IP tunnel. In one example, the routing device 212 may receive communication instructions from the ASN server 208 to retrieve the data from the specific GRE tunnel but then provide the data (without further tunneling or encapsulation) to a destination.

In another embodiment, a MS or BS may provide data directly to the routing device 212 via IP tunneling (e.g., the CSN side). Similar to the ASN server example, the routing device 212 may be directed to unpack the data from the IP tunnel by communication instructions from the CSN server 706 and then provide the data "as is" to the destination.

Figure 9:
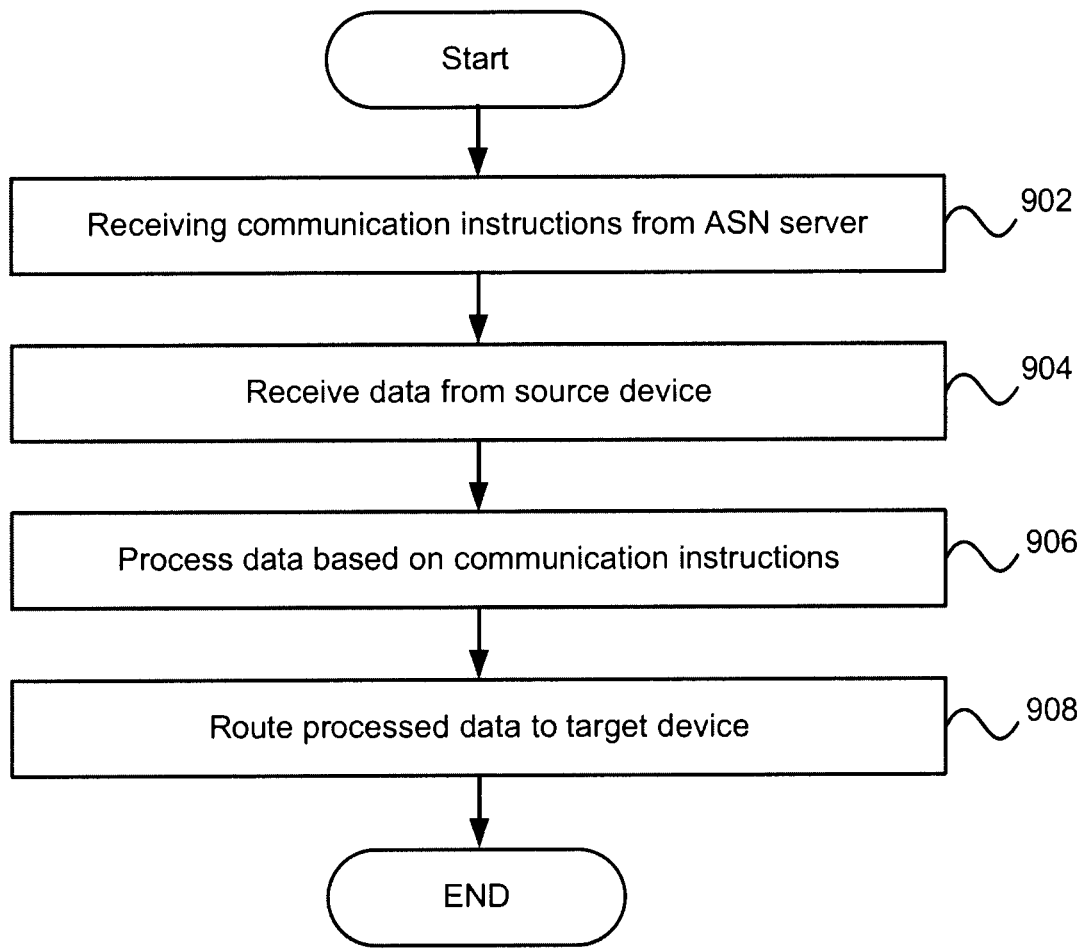
FIG. 9 is a flow diagram of an exemplary method for decentralized distribution of data in a WiMax network.

FIG. 9 is a flow diagram of an exemplary method for decentralized distribution of data in a WiMax network. In step 902, the control module 302 (see FIG. 3) of the routing device 212 receives communication instructions from an ASN server 210 (e.g., from the routing communication module 408—see FIG. 4). In some embodiments, the communication instructions comprise instructions to retrieve data (e.g., a service flow) from a specific GRE tunnel.

In step 904, the router module 306 of the routing device 212 receives data from a source device such as a BS. In step 906, the service module 304 instructs the router module 306 of the routing device to process data based on the communication instructions (e.g., via data path instructions). For example, the service module 304 identifies which GRE tunnel to unpack data from and instructs the router module 306 accordingly.

In step 908, the router module 306 routes the data (e.g., the service flow) based on the instructions from the service module 304 to the target device (e.g., a device on the Internet, an ASP server, or the like).

Figure 10:
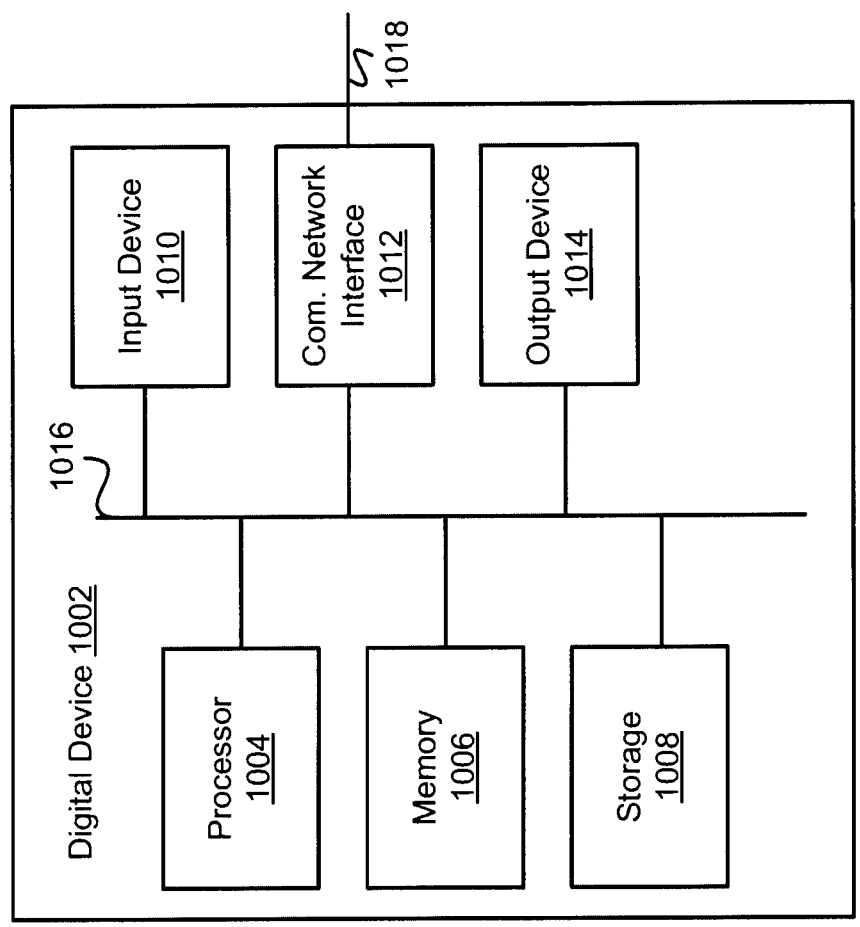
FIG. 10 is a block diagram of an exemplary digital device.

FIG. 10 is a block diagram of an exemplary digital device 1002. Any of the SS, MS, ASN server, CSN server, digital router, may be an instance of the digital device 1002. The digital device 1002 comprises a processor 1004, memory 1006, storage 1008, an input device 1010, a communication network interface 1012, and an output device 1014 communicatively coupled to a communication channel 1016. The processor 1004 is configured to execute executable instructions (e.g., programs). In some embodiments, the processor 1004 comprises circuitry or any processor capable of processing the executable instructions.

The memory 1006 stores data. Some examples of memory 1006 include storage devices, such as RAM, ROM, RAM cache, virtual memory, etc. In various embodiments, working data is stored within the memory 1006. The data within the memory 1006 may be cleared or ultimately transferred to the storage 1008.

The storage 1008 includes any storage configured to retrieve and store data. Some examples of the storage 1008 include flash drives, hard drives, optical drives, and/or magnetic tape. Each of the memory system 1006 and the storage system 1008 comprises a computer-readable medium, which stores instructions or programs executable by processor 1004.

The input device 1010 is any device that inputs data, e.g., mouse and keyboard. The output device 1014 outputs data, e.g., a speaker or display. Those skilled in the art will appreciate that the storage 1008, input device 1010, and output device may be optional. For example, the routing device may comprise the processor 1004 and memory 1006 as well as a device to receive and output data (e.g., the communication network interface 1012 and/or the output device 1014).

The communication network interface (com. network interface) 1012 may be coupled to a network (e.g., communication network 106) via the link 1018. The communication network interface 1012 may support communication over an Ethernet connection, a serial connection, a parallel connection, and/or an ATA connection. The communication network interface 1012 may also support wireless communication (e.g., 802.11 a/b/g/n, WiMax, LTE, WiFi). It will be apparent to those skilled in the art that the communication network interface 1012 can support many wired and wireless standards.

It will be appreciated by those skilled in the art that the hardware elements of the digital device 1002 are not limited to those depicted in FIG. 10. A digital device 1002 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 1004 and/or a co-processor located on a GPU (i.e., Nvidia).

In various embodiments, control of data routing and the actual routing are separated. In one example, the control of the data routing may be performed by a first digital device such as a control server (e.g., an ASN server, CSN server, LTE server, or other wireless server). The actual routing may be performed by a second digital device such as a routing device (e.g., which may comprise an off-the-shelf router). The control server may generate routing instructions (e.g., communication instructions) which may be provided to the routing device (e.g., via the R7 interface). The routing device may then route network data (e.g., data from a source device to be received by a target device) based on the routing instructions. In some embodiments, the actual routing of data is performed by the routing device. Routing instructions may comprise instructions to the routing device that controls the data path. In some embodiments, the router (e.g., Juniper router) in a routing device is configured to receive and/or perform functions in response to the routing instructions.

For example, the routing instructions configure the routing device to receive data from a particular ingress interface and provide data at a particular egress interface. An interface is a logical (e.g., GRE or Mobile IP tunnel) or physical port on an access router which receives and/or transmits packets. An egress interface is an interface from which packets exit the access router. An ingress interface is an interface to which packets arrive at the access router. A GRE tunnel may be identified by a 3-tuple (e.g., source endpoint IP, a destination endpoint IP, and GRE key). A GRE tunnel may be further described in RFC 2784. The mobile IP tunnel may be further described in RFC 3344.

In various embodiments, by separating out control of the routing function to a separate digital device such as a control server from another digital device such as a routing device, the same routing device may be used by a variety of control servers. In one example, the same routing device may receive routing instructions from an ASN server and a CSN server. The routing device may route network data based on the routing instructions from both servers. Those skilled in the art will appreciate that the routing device may receive routing instructions from any number of digital devices.

The digital device that generates routing instructions may be replaced without replacing the routing device. In one example, an ASN server which generates routing instructions for a routing device may be replaced with an LTE server. The LTE server may also control the routing device by generating routing instructions. The routing device may be agnostic as to the server or network (e.g., WiMax, LTE, or other network) which provides the routing instructions.

In some embodiments, the router in the routing device is configured to receive routing instructions which control routing commands that are resident in the router. The routing commands in the router may be configured by the router manufacturer (e.g., Juniper). In some embodiments, the router may not comprise any routing command that is specific to an architecture of wireless communications (e.g., LTE or WiMAX).

In various embodiments, separating the control and the routing functions between two or more digital devices may allow for increased redundancy. Instead or replacing or adding expensive and complex servers that perform both server and routing functions (e.g., ASN server of the prior art and the CSN server of the prior art), there may be multiple routing devices each comprising a commercially available router. If one routing device fails, the control server may route data to another routing device. Since the routing device may comprise commercially available routers, replacements or redundant back-ups may be less expensive and less complex than replacing entire gateways in the prior art.

Figure 11:
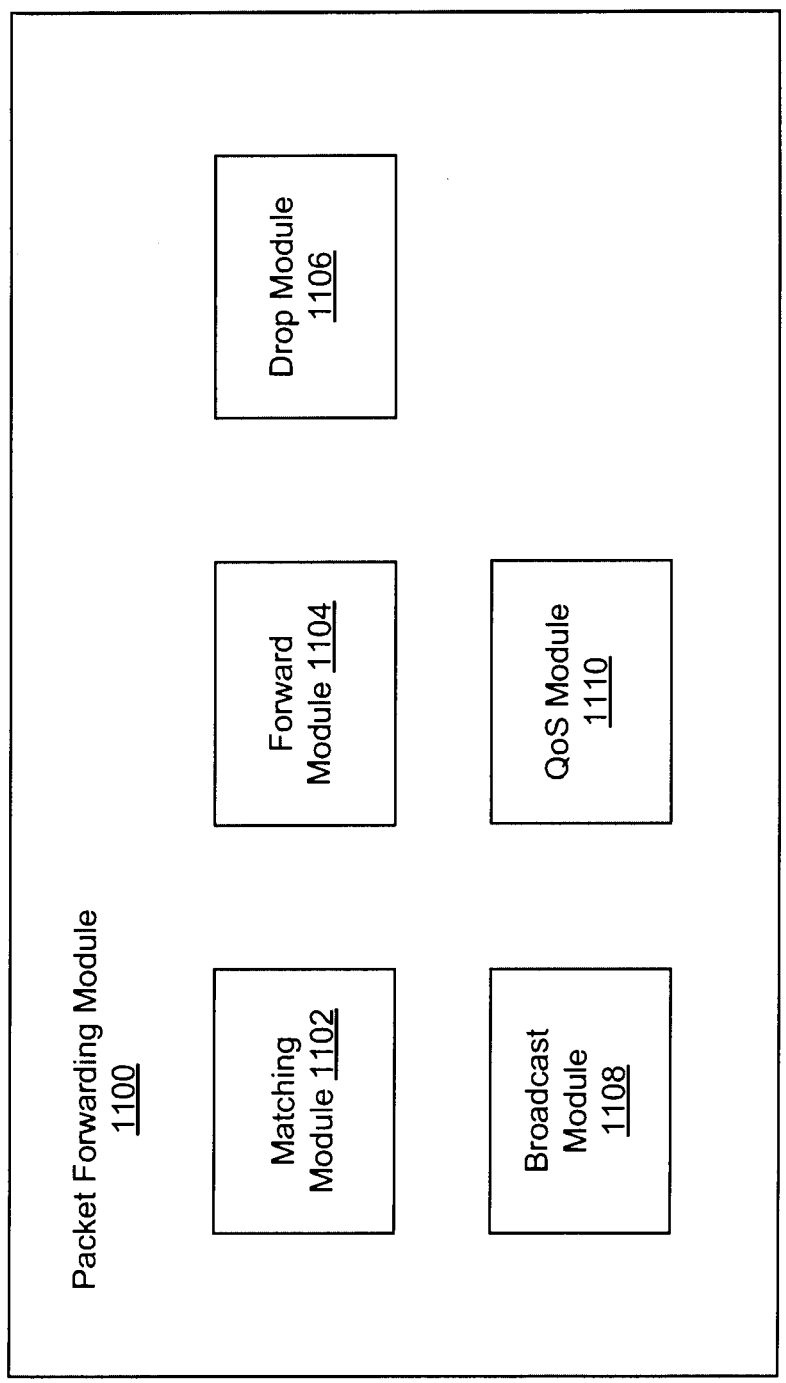
FIG. 11 is a block diagram of an exemplary packet forwarding module.

FIG. 11 is a block diagram of an exemplary packet forwarding module 1100. In some embodiments, the ASN server 210 comprises the packet forwarding module 1100. In other embodiments, the routing device 212 comprises the packet forwarding module 1100. Those skilled in the art will appreciate that any control server (e.g., wireless server) or digital device may comprise the packet forwarding module 1100. In some embodiments, the functions of the packet forwarding module 1100 may be shared by two or more control servers and/or digital devices.

The packet forwarding module 1100 comprises a matching module 1102, a forward module 1104, a drop module 1106, a broadcast module 1108, and a QoS module 1110. The matching module 1102 may generate one or more routing instructions to match incoming network data (e.g., from a stationary subscriber (SS) or an MS) using packet classification rules to determine what action to take for one or more packets or service flows. The packet classification rules may comprise actions to be taken for identified data received from an ingress interface. Packet classification rules may be contained within any data structure or combination of data structures.

In some embodiments, a packet classifier comprises the packet classification rules. A packet classifier may comprise an index which may comprise a priority and matching condition which are the conjunction of any number of criteria. The index may uniquely identify the classifier on the interface and may have values in the range of 0-65538. The priority (0-255 highest) may define the order that the classifier rules are tried in. In some embodiments, the forward module 1104, the drop module 1106, the broadcast module 1108, and/or the QoS module 1110 are configured to generate one or more routing instructions that are stored within the packet classifier. For example, the forward module 1104 may generate one or more instructions that identify a matching condition and an action to be performed that is stored in the packet classifier.

The forward module 1104 may generate one or more routing instructions to forward matching incoming traffic arriving on a specific ingress interface to a specific egress interface. In one example, the forward module 1104 generates one or more routing instructions to forward network data (e.g., data received from a source device) from one ingress interface to an egress interface. For example, an ASN server 210 may receive control data from an MS that network data from the MS is to be provided to a CSN gateway and/or a target device. The forward module 1104 may generate one or more routing instructions to forward network data received from one GRE tunnel and (after unencapsulating the data) tunnel the data through a specific IP to IP tunnel to the CSN gateway. The routing instructions may then be provided to the routing device (e.g., via UDP or any protocol).

In another example, the ASN server 210 may receive control data from the CSN server that indicates that network data from the CSN server is to be forwarded to a SS. The forward module 1104 may generate one or more routing instructions to receive network data from a specific IP to IP tunnel and provide the network data to a specific GRE tunnel.

In some embodiments, the forward module 1104 may also generate one or more routing instructions to perform a variety of different R7 command types. For example, the forward module 1104 maybe configured to generate one or more routing instructions to create a tunnel, destroy a tunnel, or update a tunnel. When the forward module 1104 generates one or more routing instructions to create a tunnel, the routing device may be configured to create a specified tunnel. For example, the routing device may be configured to create a tunnel between the routing device and a BS (e.g., a GRE tunnel) and/or a tunnel between the routing device and a CSN router (e.g., an IP to IP tunnel). The forward module 1104 may be configured to generate any type of tunnel.

When the forward module 1104 generates one or more routing instructions to destroy a tunnel, the routing device may be configured to destroy a specified tunnel. The forward module 1104 may generate one or more routing instructions to destroy a tunnel when the tunnel is no longer being used. For example, when an MS moves out of an area serviced by a particular ASN server, a routing device associated with the ASN server may be configured to destroy a GRE tunnel that was formerly being used between the MS and the routing device. In another example, the routing device may be configured to destroy an IP to IP tunnel between the routing device and a CSN router. The forward module 1104 may be configured to destroy any type of tunnel.

The forward module 1104 may also be configured generate one or more routing instructions to update any type of tunnel and/or update the parameters associated with an existing tunnel. In one example, the forward module 1104 may generate one or more routing instructions to change the type of tunnel from a GRE tunnel to a VLAN tunnel. Further, the forward module 1104 may generate one or more routing instructions to change tunnel parameters. For example, the forward module 1104 may generate one or more routing instructions to change GRE flags to enable sequence numbers, enable fragmentation, enable 1400B MTU.

The forward module 1104 may also be configured to generate one or more routing instructions to create a route and delete a route. When the forward module 1104 generates one or more routing instructions to create a route, the routing device may be configured to create an IP forwarding route which may forward network data from one ingress interface to an egress interface. When the forward module 1104 generates one or more routing instructions to delete a route, the routing device may be configured to destroy an IP forwarding route. In some embodiments, the forward module 1104 may also be configured to generate one or more routing instructions to update or otherwise alter existing routes or change parameters associated with existing routes.

Those skilled in the art will appreciate that the forward module 1104 may forward data between any interfaces and/or any type of tunnel (e.g., GRE, Mobile IP, VLAN, MPLS, etc.) Similarly, those skilled in the art will appreciate that the packet forwarding module 1100 (and the components thereof) may work with any kind of tunnel or interface (e.g., destroy any type of tunnel or generate a scheduler for any type of tunnel).

The drop module 1106 may generate one or more routing instructions to drop matching incoming traffic arriving on a specific ingress interface. In one example, the drop module 1106 generates one or more routing instructions to drop network data (e.g., data received from a source device) from one ingress interface. For example, when an MS transitions from an area served by one ASN server 210 to another, for a short period of time, network data from the MS may be broadcast to both ASN servers. Once the handoff from one ASN server to the other is complete, the drop module 1106 may generate one or more routing instructions to drop any network data that may be received from the former ingress interface (e.g., GRE tunnel). The forward module 1104 may also generate one or more routing instructions to destroy the former ingress interface.

In another example, an ASN server 210 may receive an indication that an MS is no longer receiving data (e.g., the MS is shut off). The drop module 1106 may be configured to generate one or more routing instructions to drop network data from the CSN gateway (e.g., via an IP to IP tunnel) that is directed to the MS.

In another example, the drop module 1106 may be configured to generate one or more routing instructions to drop network data associated with a particular service. In one example, a user of an MS may be sending out netbios packets which may be dropped by the routing device based on routing instructions generated by the drop module 1106. In another example, a particular tunnel may carry a type of data (e.g., VoIP) that a subscriber has not purchased. As a result, VoIP data from that particular tunnel may be dropped.

The broadcast module 1108 may be configured to generate one or more routing instructions to copy outgoing traffic to two or more additional egress interfaces. In some embodiments, the ASN server 120 may receive control data to provide network data received at an ingress interface and broadcast the network data over two or more egress interfaces. In one example, when an MS travels from one area served by a first ASN server to another area served by a second ASN server, the broadcast module 1108 may generate one or more routing instructions to bi-cast any network data destined for the MS over a GRE tunnel to the MS as well as direct a copy of the network data to another ASN server and/or other routing device which will forward the network data via another GRE tunnel. By bi-casting the network data, the MS may receive the network data even if the MS is out of the area of one of the ASN servers.

The QoS module 1110 may be configured to generate one or more routing instructions to drop or buffer packets at egress interfaces according to hierarchical quality of service (QoS) policies. In some embodiments, the QoS module 1110 controls the quality of service of the routing device. As such, the QoS module 1110 may generate one or more routing instructions to buffer packets at an egress interface in order to prioritize network data and ensure quality of service. If the packets overflow the buffer or violate a QoS policy, for example, the QoS module 1110 may generate an instruction to drop one or more of the packets.

Those skilled in the art will appreciate that the QoS module 1110 may generate one or more routing instructions for any kind of QoS policy including scheduling (e.g., based on scheduling parameters such as maximum rate, guaranteed rate, scheduling priority, and/or scheduling priority type) and/or packet shaping functions. In some embodiments, the QoS module 1110 may generate instructions to create a scheduler, update a scheduler, and/or destroy a scheduler. In some embodiments, the QoS module 1110 generates one or more routing instructions for the routing device to create a scheduler with a given quality of service for a specific egress interface. For example, QoS module 1110 may generate one or more routing instructions for the routing device to create a scheduler that prioritizes VoIP data over a particular IP to IP tunnel such that VoIP services are unlikely to suffer poor performance due to packet throughput. Those skilled in the art will appreciate that the QoS module 1110 may create any kind of scheduler associated with any type and/or number of egress interfaces.

The QoS module 1110 may also generate one or more routing instructions to update a scheduler. In one example, the QoS module 1110 may determine that the network performance one a first egress interface is lower than expected (e.g., by receiving updates of the quality of the network and/or egress interface from the routing device). As a result, the QoS module 1110 may generate one or more routing instructions to update an existing scheduler for the first egress interface such that network data sent via the first egress interface does not require high performance. The QoS module 1110 may also generate one or more other routing instruction to update another existing scheduler for a higher performing egress interface to packet shape network data that requires a higher guaranteed grade of service. Those skilled in the art will appreciate that many schedulers may be created or updated depending on the quality of service required, needed, or preferred.

In some embodiments, the QoS module 1110 generates one or more instructions to destroy a scheduler. In one example, the QoS module 1110 generates an instruction to delete a scheduler or an egress interface.

The QoS module 1110 may also be configured to generate one or more routing instructions to add a tunnel to an existing scheduler or remove a tunnel from an existing scheduler. In some examples, the QoS module 1110 may generate one or more routing instructions to add a GRE tunnel to or remove a GRE tunnel from an existing scheduler. Further, in some embodiments, the QoS module 1110 may be configured to generate one or more routing instructions to cascade two or more schedulers. As a result, the routing device may be configured to cascade two or more schedulers such that the top scheduler uses a priority and guaranteed bit rate of the sub-schedulers.

Figure 12:
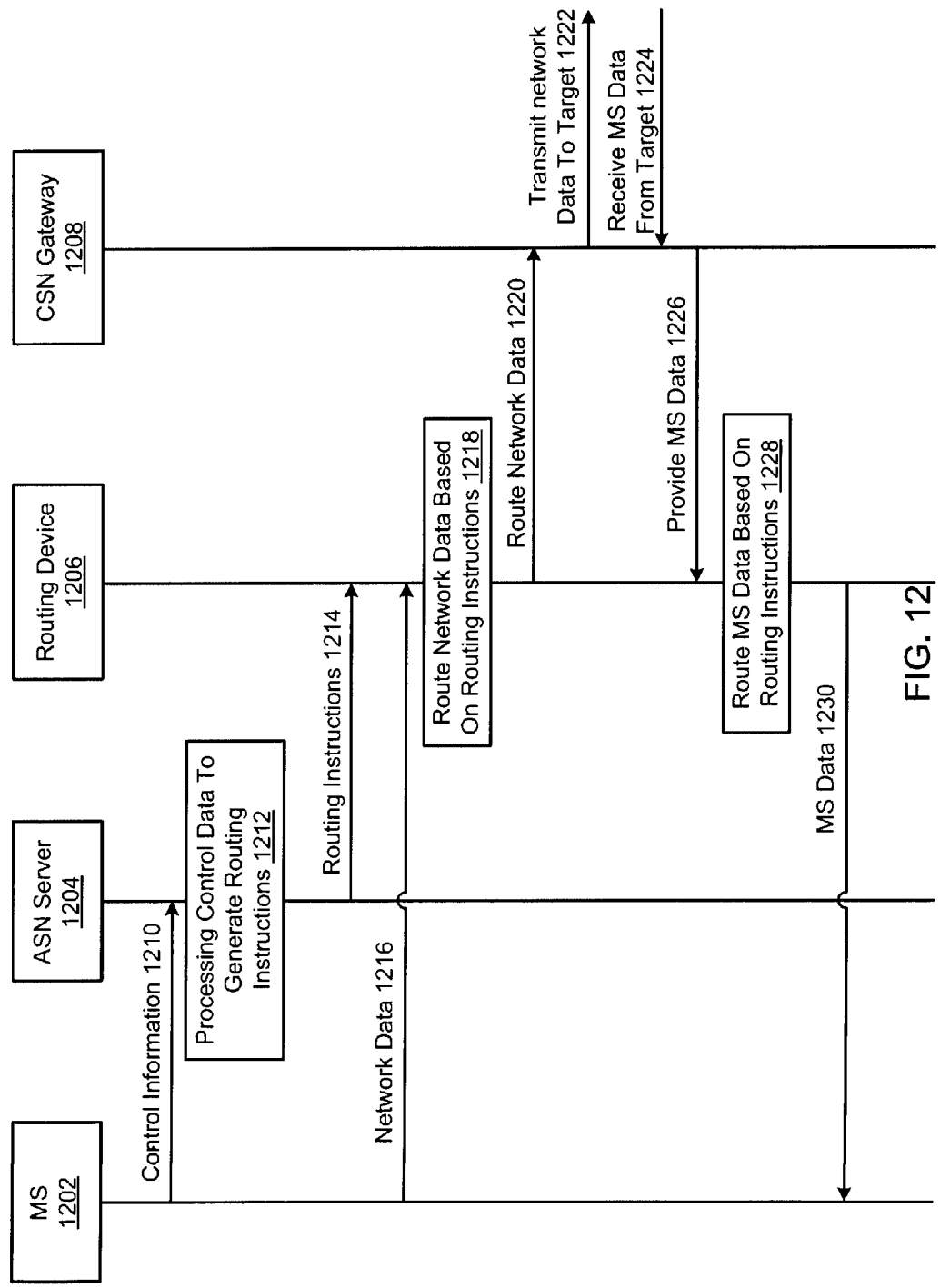
FIG. 12 is a block diagram of an exemplary data path process.

FIG. 12 is a block diagram of an exemplary data path process. The exemplary data path process comprises four digital devices including an MS 1202, an ASN server 1204, an routing device 1206, and a CSN gateway. Those skilled in the art will appreciate that the exemplary data path process may be used between any source device communicating with a target device over a wireless network comprising any control server and any routing device.

In step 1210, control information (e.g., control data) is transmitted from the MS 1202 to the ASN server 1204. The control information may comprise any information related to a session associated with the ASN server 1204. In some embodiments, the control information indicates that the MS 1202 is to communicate with a target device on a network such as the Internet.

In step 1212, the ASN server 1204 processes the control information to generate one or more routing instructions. In some embodiments, the packet forwarding module 1100 may receive the control data from the MS 1202. The forward module 1104 may be configured to generate one or more routing instructions to generate a GRE tunnel between a BS and the routing device 1206, generate an IP to IP tunnel between the routing device 1206 and the CSN gateway 1208, and assign a route such that network data received from the newly created GRE tunnel is tunneled using the newly formed IP to IP tunnel to the CSN gateway 1208. In some embodiments, a QoS module 1110 may be configured to generate one or more routing instructions associated with a quality of service for the network data (e.g., a level of performance for the network data).

The routing instructions are provided to the routing device 1206 in step 1214. In some embodiments, the routing instructions are provided to the routing device 1206 via the R7 interface. The routing instructions may be provided in any protocol. The routing instructions may be used to configure the routing device 1206 (e.g., a router in the routing device 1206). In some embodiments, the routing device 1206 generates a specific GRE tunnel between the routing device 1206 and the base station associated with the MS 1202 based on the routing instructions. The routing device 1206 may also create an IP to IP tunnel from the routing device 1206 to the CSN gateway 1208.

In some embodiments, the one or more of the routing instructions configure and/or are stored in a packet classifier. In one example, one or more entries of the packet classifier may be generated based on the routing instructions. In one example, the one or more entries indicate that matching data (e.g., network data received over the newly created GRE tunnel) is to be forwarded to a specific egress interface (e.g., the newly created IP to IP tunnel). Further, the one or more entries of the packet classifier may indicate that matching data received over the IP to IP tunnel from the CSN gateway 1208 is to be forwarded and tunneled over the newly created GRE tunnel to send the matching data to the MS 1202 via the BS.

In step 1216, network data is provided from the MS 1202 to the routing device 1206. In some embodiments, the network data is sent from the MS 1202 to a target device on the Internet. The network data 1216 may be received wirelessly by the BS which tunnels the network data via the GRE tunnel to the routing device 1206.

Those skilled in the art will appreciate that the BS may comprise the routing device 1206. Alternately, the routing device 1206 may not be within the BS. In some embodiments, the routing device 1206 may perform routing based on routing instructions from the ASN server 1204, a CSN server (not depicted), or both.

In step 1218, the routing device 1206 routes network data based on the routing instructions. In some embodiments, the routing device 1206 receives the network data via the newly created GRE tunnel. The routing device 1206 may determine that data from the specific GRE tunnel is matching data (e.g., matches information within the packet classifier) and then follow any actions associated with the match. In one example, the routing device 1206 may route all data received from the specific GRE tunnel to the newly created IP to IP tunnel. The routing device 1206 may have also created a scheduler which buffers, prioritizes, and/or otherwise schedules the network data for tunneling over one or more tunnels.

In step 1220, the network data is routed to the CSN gateway 1208. In one example, the network data is tunneled to the CSN gateway 1208 via the IP to IP tunnel. The CSN gateway 1208 may then transmit the network data to the target device in step 1222 (e.g., over the Internet).

In step 1224, MS data (e.g., network data sent to the MS 1202) is received by the CSN gateway 1208. In one example, the MS data is from a digital device on the Internet that received the network data provided by the MS 1202 in step 1222. The CSN gateway 1208 may provide the MS data to the routing device 1206 in step 1226. In one example, the routing device 1206 receives the MS data via the IP to IP tunnel.

In step 1228, the routing device routes the MS data based on routing instructions. In some embodiments, the routing device 1206 matches the MS data from the IP to IP tunnel based on information contained in the packet classifier. In one example, matching data (e.g., data received via the specific IP to IP tunnel) is tunneled using the specific GRE tunnel to the BS and, ultimately, to the target device (e.g., the MS 1202).

In step 1230, the MS data 1230 is received by the MS 1202. In one example, the MS data is tunneled via the GRE tunnel to the BS which forwards the MS data to the MS 1202. In various embodiments, the BS forwards the MS data to the MS 1202 wirelessly.

Although routing is discussed in FIG. 12 as possibly using a packet classifier, those skilled in the art will appreciate that the packet classifier is optional. In one example, the routing device 1206 is configured to route all data received via one ingress interface to an egress interface without matching. The routing device 1206 may be configured to route network data and/or MS data using the routing instructions in any number of ways.

Figure 13:
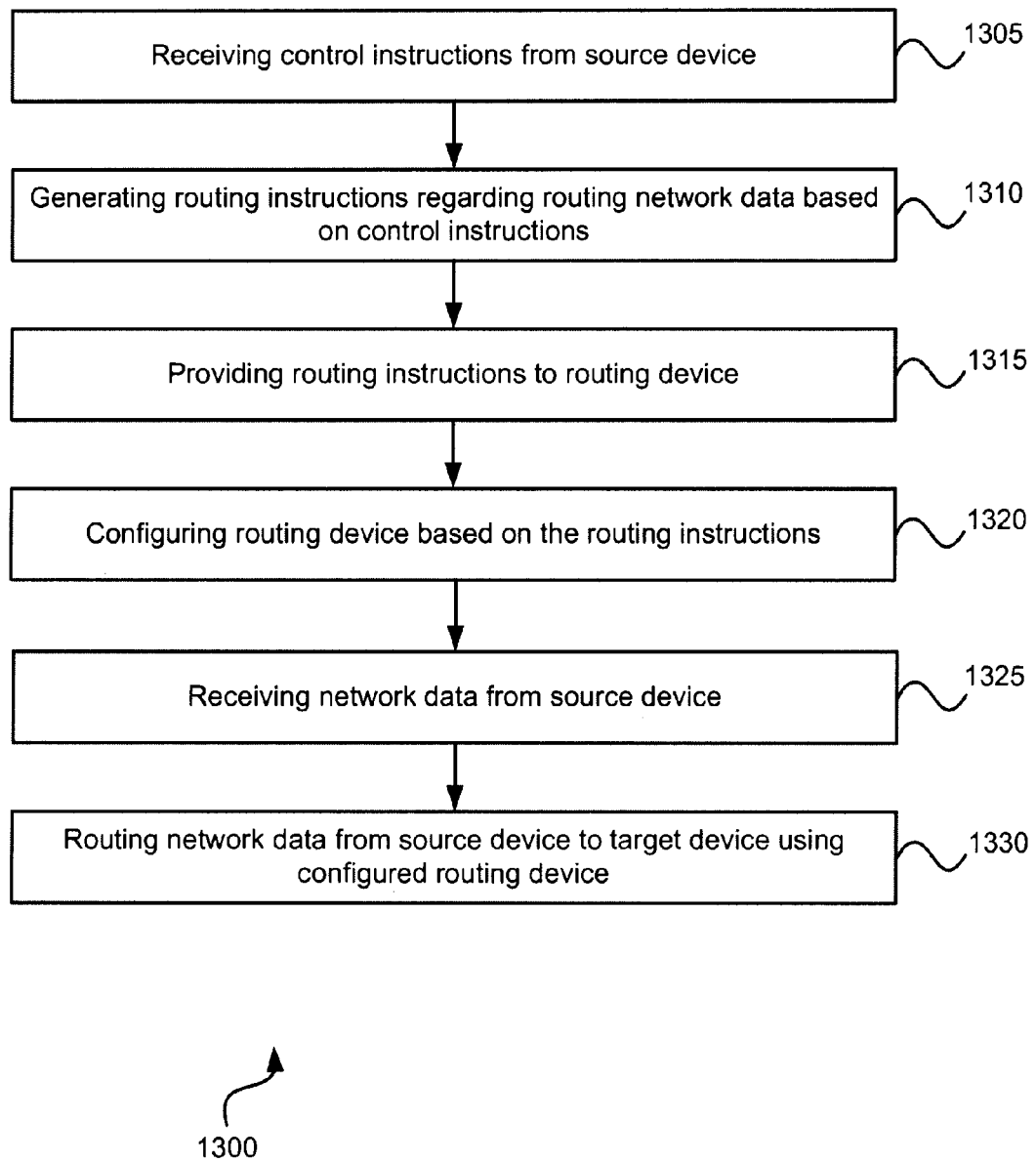
FIG. 13 is a flow diagram of an exemplary method for data path processing.

FIG. 13 is a flow diagram of an exemplary method for data path processing. In step 1305, a control server such as an ASN server 120 receives control instructions (e.g., control data) from a source device such as a SS. The control instructions may indicate that network data is to be received from the SS and routed to two or more target devices that are operably coupled to a CSN gateway via a network. In one example, the control instructions are received by a packet forwarding module 1100 (see FIG. 11) within the ASN server. Those skilled in the art will appreciate that the control server may comprise any kind of server, including a CSN server, LTE server, WiMAX server, and/or any wireless server.

In step 1310, the packet forwarding module 1100 generates one or more routing instructions regarding routing network data based on the control instructions. The matching module 1102 may also generate one or more routing instructions which may configure and/or control the routing device to match network data (e.g., network data received via a specific GRE tunnel) and perform various actions including actions associated with routing instructions generated by one or more other modules of the packet forwarding module 1100.

In on example, the forward module 1104 may generate one or more routing instruction to create a GRE tunnel between the routing device and a BS in communication with the SS. The forward module 1104, based on the control instructions, may also generate one or more routing instructions to create a tunnel to a CSN router, CSN gateway, or other digital device(s). The broadcast module 108, based on the control instructions, may generate one or more routing instructions to broadcast network data received via the GRE tunnel to two or more digital devices such as target devices (e.g., by tunneling the network data through two or more different tunnels such as VLAN tunnels). The QoS module 1110, based on the control instructions, may generate one or more routing instructions to create one or more schedulers to one or more egress interfaces (e.g., the egress interfaces identified in the routing instruction(s)) generated by the forward module 1104.

In step 1315, the packet forwarding module 1100 may provide the routing instructions to the routing device. In step 1320, the routing device 212 (see FIG. 3) is configured or controlled based on the routing instructions. In one example, a control module 302 of the routing device 212 may receive the routing instructions and the service module 304 may configure the router module 306 based on the routing instructions. In one example, one or more of the routing instructions are associated with a packet classifier. The service module 304 and/or the router module 306 may comprise the packet classifier. For example, the router module 306 may also create, destroy, or update tunnels and/or routes based on the routing instructions.

In step 1325, the routing device 212 receives network data from a source device. In one example, the SS wirelessly transmits network data to the BS that provides the network data to the routing device 212 via the GRE tunnel that was generated by the router module 306.

In step 1330, the configured routing device 212 routes network data from the source device to a target device. In one example, the router module 306 matches network data received over the GRE tunnel with actions in the packet classifier to route and broadcast the network data to two or more egress interfaces. Further, the router module 306 may be configured to schedule the network data at the two or more egress interfaces. Each egress interface maybe scheduled differently depending on the routing instruction received from the packet forwarding module 1110.

Figure 14:
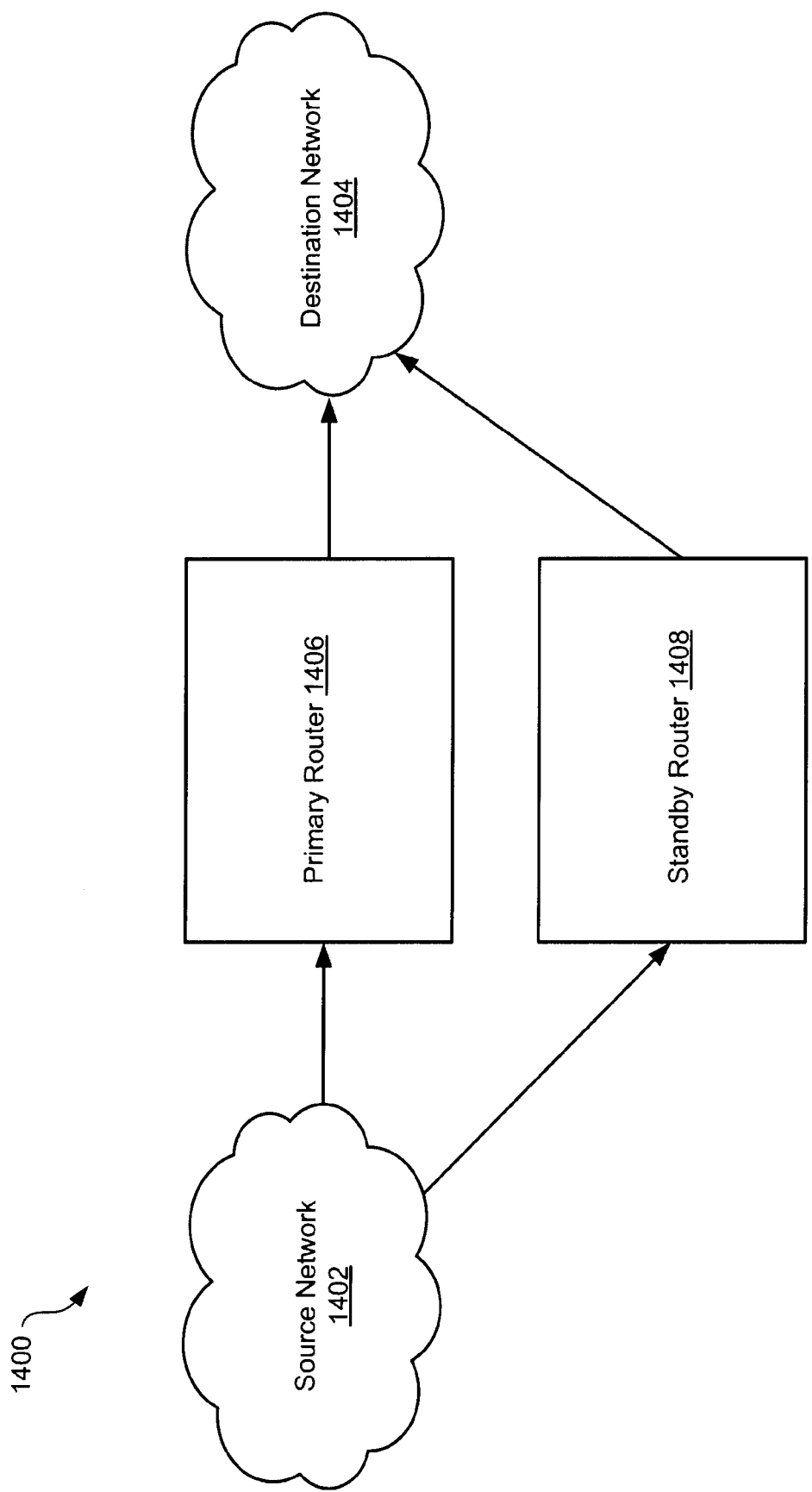
FIG. 14 is a block diagram of an exemplary environment for router redundancy.

FIG. 14 is a block diagram of an exemplary environment 1400 for router redundancy. The environment 1400 comprises a source network 1402 and a destination network 1404. Data is routed from the source network 1402 to the destination network 1404 via a primary router 1406. If the primary router 1406 fails or goes offline, the data is routed from the source network 1402 to the destination network 1404 via the standby router 1408.

The source network 1402 and the destination network 1404 may be any network comprising one or more network devices. In one example, a network device of the source network 1402 provides data to the primary router 1406. As discussed herein, a network device is any device (e.g., router, bridge, hub, server, or a digital device) that may provide data to a digital device or router. The primary router 1406 and the standby router 1408 may be any router configured to route data to one or more destinations. A router, as depicted in FIG. 14, is any device, or combination of devices which determine where packets, messages, or other signals travel to next.

In some embodiments, one or more network devices of the source network 1402 may detect that the primary router 1406 is unavailable, nonfunctional, and/or has failed. The network devices may then redirect data from the primary router 1406 to the standby router 1408. In one example, the network devices no longer receives acknowledgement (e.g., an "ack" message) that data was received from the primary router 1406 and begins to route data to the standby router 1408. The standby router 1408 may be an exact duplicate of the primary router 1406. In another example, the network devices may no longer receive status updates from the primary router 1406 or receive information from the primary route 1406. Since the status updates are no longer received, the network devices may determine that the router is unavailable or nonfunctional. Those skilled in the art will appreciate that there are many ways in which one or more network devices may determine that the primary router 1406 is unavailable.

In various embodiments, data from the source network 1402 is received by both the primary router 1406 and the standby router 1408. The standby router 1408 may not route the data unless the primary router 1406 is determined to be unavailable, nonfunctional, and/or has failed. In some embodiments, the standby router 1408 routes data initially sent to the primary router 1406 when the primary router 1406 is too busy to route all of the data (e.g., the standby router 1408 routes overflow data when the primary router 1406 is too busy).

The primary router 1406 and the standby router 1408 may be in the same location (i.e., geolocated). In other embodiments, the primary router 1406 may be in a separate location than the standby router 1408.

Figure 15:
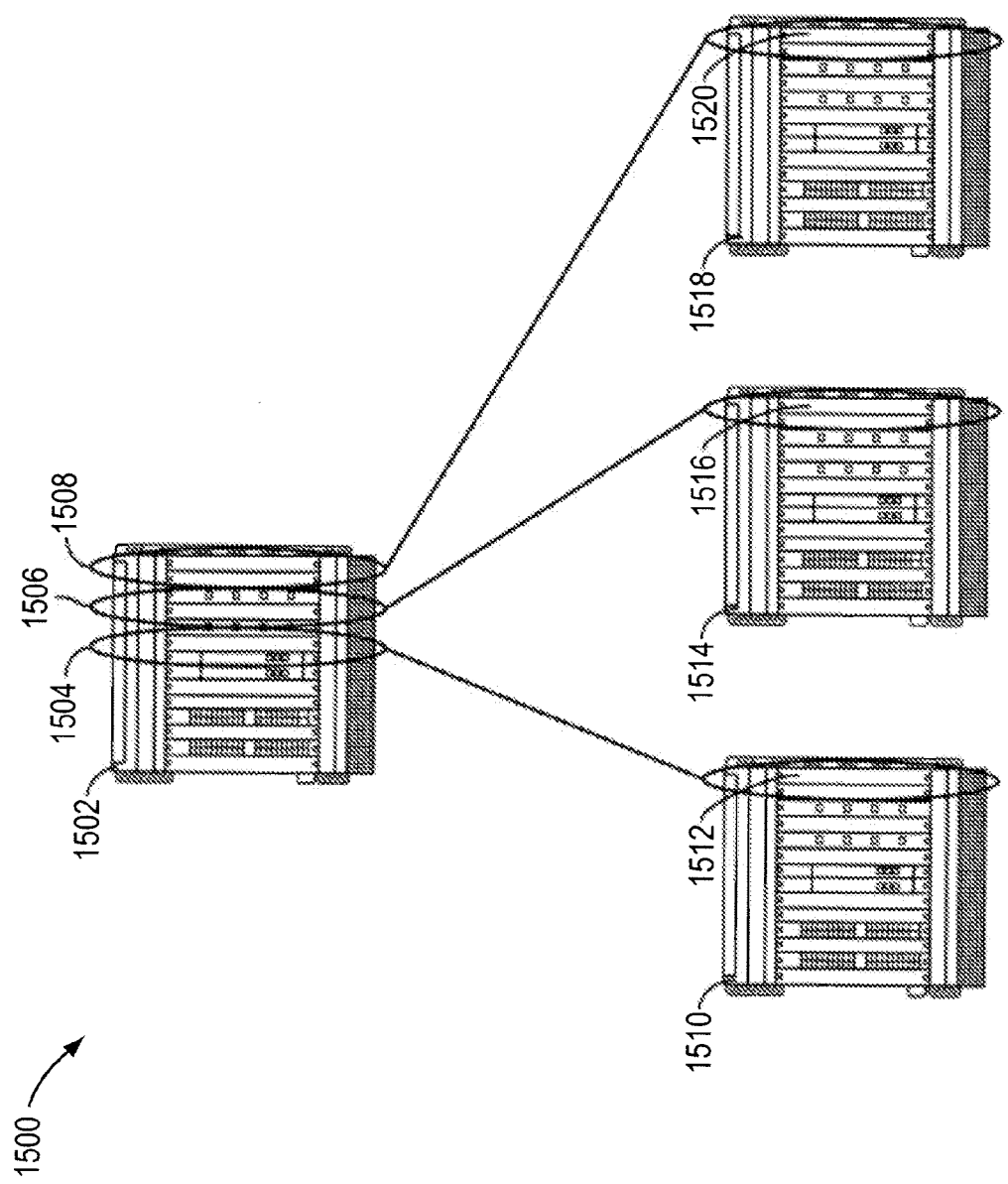
FIG. 15 is a block diagram of fractional router redundancy in some embodiments.

FIG. 15 is a block diagram 1500 of fractional router redundancy in some embodiments. The block diagram 1500 comprises router 1502, router 1510, router 1514, and router 1518. Routing information is an important function of data network management. When a router, or any portion thereof, becomes unavailable, nonfunctional, and/or has failed, redundant systems are generally available to prevent system outages or loss of data. Typically, it is not uncommon for a router to have a co-located back-up router to take over if the primary router fails. Unfortunately, a dedicated back-up router may be expensive. Further, if the primary router fails due to power loss or a localized phenomena (e.g., structural failure of a building housing the router or fire), the other standby router may be effected. In other words, the reason for a failure of the primary router may also cause the standby router to fail.

In various embodiments, a geographically diverse fractional routing system may be used such as that depicted in FIG. 15. In some embodiments, a router may route multiple data flows to different destinations. A data flow comprises related data (e.g., data for video, communications, telephone calls, audio, application downloads, uploads, and the like). In one example, a router comprises different portions, such as blades, that may each function to route data flows to different destinations. For example, a first portion 1504 may be configured to route data associated with a telephone call to one destination while a second portion 1506 may be configured to route data associated with a different telephone call to another destination. These portions may either work together or independently.

The portions of routers 1502, 1510, 1514, and 1518 may function to route data independently of other portions of the router. For example, portions 1504, 1506, and 1508 of router 1502 may route different data independently of each other (i.e., different data may be routed to different destinations). Portion 1512 of router 1510 may route different data independently from other portions of router 1510. Similarly, portion 1516 of router 1514 may route different data independently from other portions of router 1514. Further, portion 1520 of router 1518 may route data independently from other portions of router 1518. In one example, portions 1504, 1506, 1508, 1512, 1516, and 1520 may each comprise one or more blades of a router. Those skilled in the art will appreciate that a portion of a router may be hardware, software, or combination of both.

In exemplary embodiments, portion 1512 of router 1510 provides redundancy services (e.g., backs-up) portion 1504 of router 1502. Similarly, portion 1516 of router 1514 and portion 1520 of router 1518 may provide redundancy services to portions 1506 and 1508 of router 1502, respectively. For example, if blade 1504 fails, then blade 1512 of router 1510 may perform the routing of failed blade 1504. Similarly, if blade 1506 fails, then blade 1516 of router 1514 may perform the routing of failed blade 1506. Further, if blade 1508 fails, then blade 1520 of router 1518 performs the routing of blade 1508.

To further illustrate, assuming that router 1502 fails and all portions of router 1502 fails as well, portion 1512 of router 1510, portion 1516 of router 1514, and portion 1520 of router 1518 will each route data for a different portion of the failed router.

In some embodiments, each router 1502, 1510, 1514, and 1518 are located remotely from each other. As a result, if router 1502 fails, it may be unlikely that the same event that caused router 1502 to fail would have any effect on the functionality of routers 1510, 1514, and 1518. As a result, different portions of those routers may back-up the routing functions of failed router 1502. In other embodiments, one or more of the routers may be located together.

In various embodiments, one or more portions of each router may be reserved for back-up purposes. For example, blade 1512 may be reserved to back-up the other blades of router 1510 as well as back-up blade 1504 of router 1502. As a result, if one of the other blades of router 1510 fails, then the reserved blade 1512 may perform the routing functions of the failed blade. Similarly, if blade 1504 or the entire router 1502 fails, then the reserved blade 1512 may perform the routing functions of blade 1504. Similarly, reserved blade 1516 of router 1514 may back-up the other blades of router 1514 and also back-up blade 1506 of router 1502. Further, reserved blade 1520 may back-up the other blades of router 1518 as well as blade 1508 of router 1502. Since the routing functions are backed-up in a fractional matter, a full back-up router which only functions when performing back-up routing may not be necessary.

Those skilled in the art will appreciate that although only four routers are depicted in FIG. 15, there may be any number of routers. Similarly, any number of routers may have one or more portions providing redundancy services to one or more other routers. FIG. 15 depicts a portion of routers 1510, 1514, and 1518 backing up router 1502 but it will also be appreciated that routers 1502, 1514 and/or 1518 may back-up all or a portion of router 1510. Similarly, any portion of any router may back-up the one or more portions of the same router (e.g., portion 1508 of router 1502 may back-up portions 1504 and 1506) and/or one or more portions of one or more other routers.

In various embodiments, the routers may be routers used in a WiMax or LTE communication system. One or more of the routers depicted in FIG. 15 may be part of an ASN 110 or CSN 112 (see FIG. 1). In one example, one of the routers of FIG. 15 may comprise a routing device 212 (see, for example, FIGS. 2, 7 and 8). All or part of the routers may be part of a satellite communication system.

Those skilled in the art will appreciate that the routers and/or portions of routers may comprise any hardware, software or both. In one example, a portion of one router may be hardware, software, or both a combination of hardware and software that is different from another portion of another router.

Figure 16:
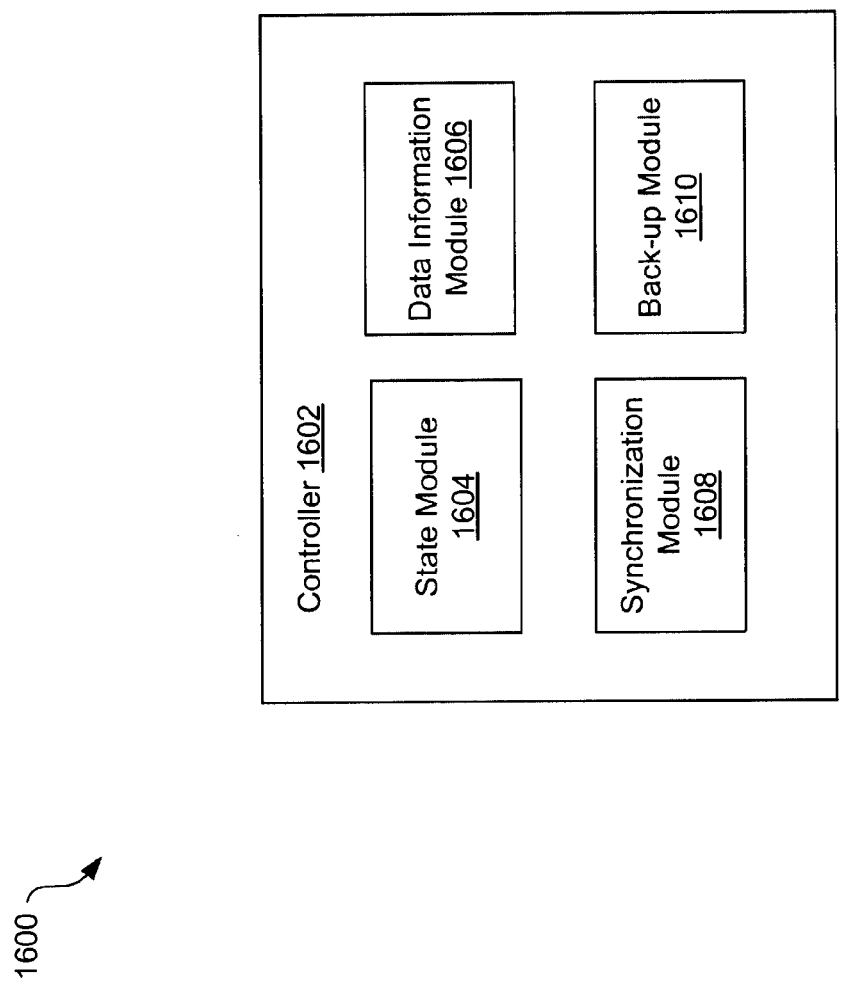
FIG. 16 is a block diagram of an exemplary controller.

FIG. 16 is a block diagram 1600 of an exemplary controller 1602. One or more routers (e.g., routers 1502, 1510, 1514, and/or 1518) may comprise one or more controllers to track and/or synchronize information regarding data of routers or portions to be routed. Controller 1602 may comprise a state module 1604, a data information module 1606, a synchronization module 1608, and a back-up module 1610.

The state module 1604 is a module that may manage the state of the router and/or track the state of a router that is being backed up (i.e., state information of the router). A state of the router is the functionality and/or performance of the router. Similarly, a state of the portion of the router is the functionality and/or performance of the portion of the router. For example, router 1502 of FIG. 15 may comprise a controller 1602. The controller 1602 of the router 1502 may monitor the state of the router 1502 and/or the state of the portions of router 1502.

In some embodiments, the state module 1604 redirects data flows to a back-up router or a portion of the back-up router. For example, if a blade of router 1502 fails, the state module 1604 may redirect data that was to be routed by the failed blade to another blade in router 1502 or to another blade of another router.

The state module 1604 may provide instructions to one or more network devices of a source network to redirect data from the router to a back-up router. For example, if the state module 1604 determines a blade of router 1502 has failed or is otherwise not available, the state module 1604 may provide instructions to the network device providing data to the router 1502. The instructions may configure or request that the network device provide at least a portion of the data to another router or portion of a router (e.g., if blade 1504 of router 1502 fails, the state module 1604 may provide instructions to the network device to redirect traffic from the failed blade 1504 to back-up blade 1512 of router 1510).

In various embodiments, the state module 1604 provides state updates to one or more network devices, routers, portions of routers, and/or other controllers. The state updates may indicate that the router and/or portions of the router are functioning. The state updates may also indicate the relative health of the router and/or portions of the router as well as the relative load (e.g., 100% currently being utilized).

In some embodiments, the state module 1604 may also monitor the state of another router. For example, the controller 1602 of router 1510 in FIG. 15 may monitor the state of router 1502 and/or portion 1504. Similarly, a controller of router 1514 may monitor the state of router 1502 and/or portion 1506. Further, a controller of router 1518 may monitor the state of router 1502 and/or portion 1508. The state module 1604 of each router may monitor the state of a router or a portion of the router that is to be backed up.

If the state module 1604 determines that the router to be backed-up is not functional or is otherwise unavailable, the state module 1604 may be configured to direct data flows to a back-up portion. For example, if the state module 1604 of controller 1602 of router 1510 determines that the blade 1504 is not functional, the state module 1604 may configure the blade 1512 to route the data that was to be routed by nonfunctional blade 1504. In some embodiments, if the state module 1604 determines that a failed router or a portion of a failed router is now available, the state module 1604 may redirect data to the primary router and/or portion of the primary router.

Those skilled in the art will appreciate that the state module 1604 may constantly monitor one or more other routers and/or portions of routers. In other embodiments, the state module 1604 may not monitor the state of the routers and/or portions of routers. In one example, a network device and/or user may provide instructions to the state module 1604 to configure a portion of a router to perform back-up functions. There may be any number of ways the state module 1604 may determine that routing redundancy functions are to be performed and/or that routing redundancy functions are no longer necessary.

In some embodiments, the state module 1604 may be configured to redirect data flows. In one example, upon a determination that a router or a portion of a router is unavailable or has failed, the state module 1604 may provide information to one or more network devices of the source network to redirect data flows to the back-up router and/or portions of routers. Those skilled in the art will appreciate that the back-up router or portions of router may receive the data in any number of ways.

In some embodiments, each router may comprise one controller 1602. In other embodiments, each router may comprise any number of controllers 1602. In one example, each portion of a router may comprise a separate controller 1602.

The data information module 1606 is configured to track data information regarding data being routed by a router and/or portions of routers. Data information is information concerning the data being routed. For example, a controller 1602 of router 1502 may monitor and/or track data being routed by the router portions 1504, 1506, and 1508. In another example, the controller 1602 of router 1502 may monitor and/or track that a telephone communication is being handled by blade 1504. In some embodiments, data information may be used to identify data belonging to a data flow an/or stream thereby, in some embodiments, allowing data to be routed by a redundant back-up router in the event of a failure.

The synchronization module 1608 is configured to receive data information from the data information module 1606 of another router. For example, the data information module 1606 of router 1502 may monitor data information regarding data to be routed by blades 1504, 1506, and 1508. The data information module 1606 may provide data information regarding data to be routed by blade 1504 to the synchronization module 1608 of the controller on the router 1510. Similarly, the data information module 1606 may provide data information regarding data to be routed by blade 1506 and blade 1508 to the synchronization modules of the controllers on the routers 1514 and 1518, respectively.

The synchronization module 1608 may continue to receive data information regarding data being routed or to be routed by a router portion in order to route the correct data with limited appreciable interruption, if any. For example, the synchronization module 1608 may receive data information that indicates that a blade 1504 is routing a telephone call. If the blade 1504 fails, the data information may be used to route the telephone call through blade 1512. The synchronization module 1608 may receive any data information regarding any data flow, stream, or other portion of data being routed by or about to be routed by a router.

The back-up module 1610 may configure or provide instructions to a router or router portion to perform routing operations as a back-up to a failed router or failed router portion. For example, while in operation, a data information module 1606 of controller 1602 on router 1502 may provide data information regarding data being routed by blade 1504 to a synchronization module 1608 on the router 1510. If the blade 1504 fails, the state module 1604 and/or the back-up module 1610 may receive data that would otherwise be routed by the failed blade 1504. The back-up module 1610 may configure the back-up blade (e.g., 1512) to route the data based, in part, on the data information of the synchronization module 1608. For example, once the router 1510 receives data to be routed, including the data that was to be routed by the failed blade 1504, the back-up module 1610 may use the data information from the synchronization module 1608 to make sure that the data to be routed by blade 1504 is routed by blade 1512.

In various embodiments, each router with a back-up portion or blade may back-up only a part of the data to be routed if an entire router fails. As such, an entire independent router need not be kept in reserve. For example, four independent routers may partially back-up a fifth router. If the fifth router fails, each of the four independent routers may only route 25% of the data traffic for the fifth router. Further, data traffic into each back-up router may be marginally impacted.

In some embodiments, data is rerouted from the failed router or portion of router to the router performing redundant routing services using MPLS fast reroute. In one example, response to redirect data to the back-up router may be 5 ms.

Figure 17:
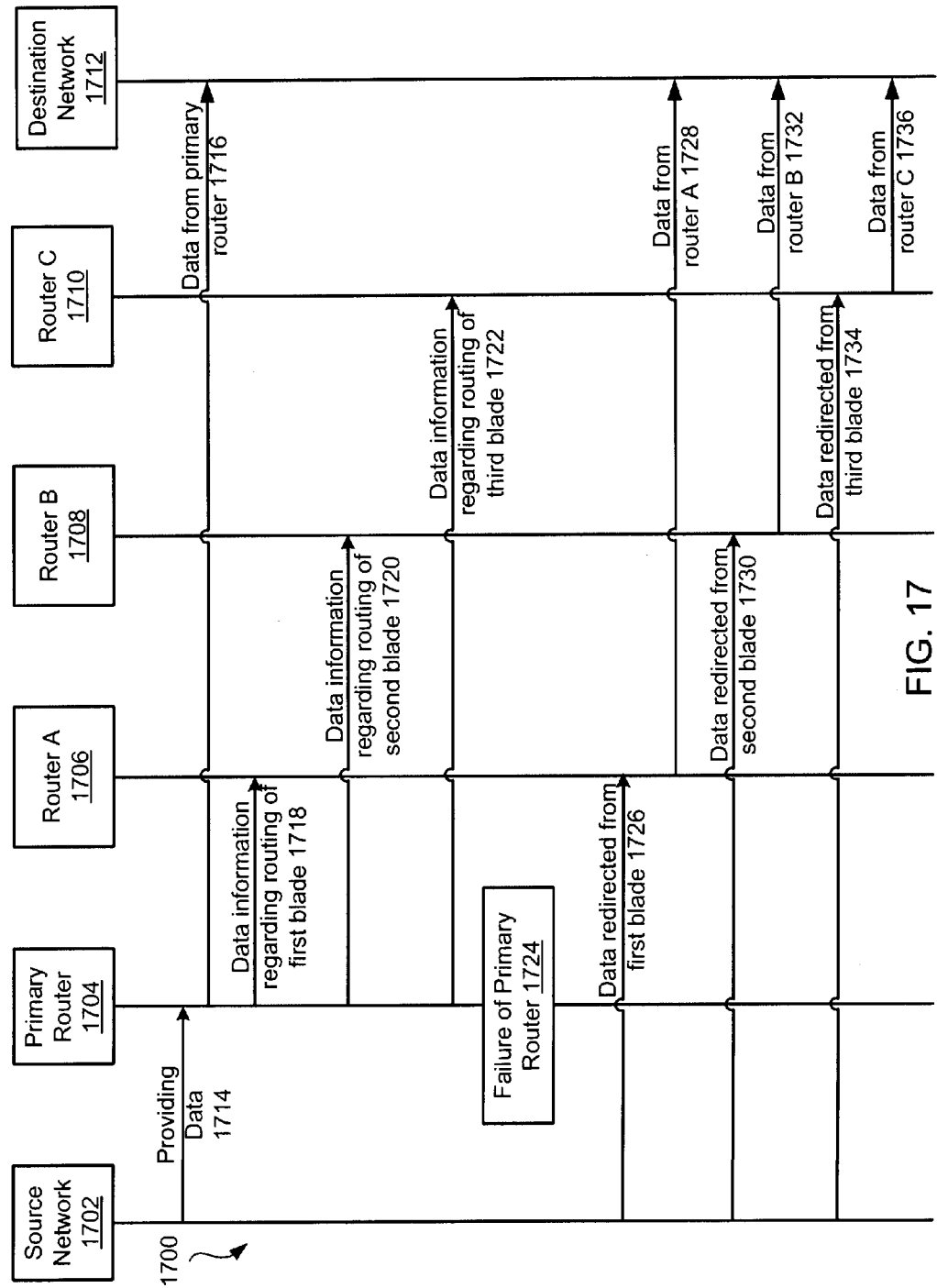
FIG. 17 is a block diagram of an exemplary fractional routing process.

FIG. 17 is a block diagram 1700 of an exemplary fractional routing process. In FIG. 17, one or more network devices of a source network 1702 provides data to be routed to one or more network devices of a destination network 1712. The primary router 1704 typically routes at least some of the data to the destination network 1712. Portions of router A 1706, router B 1708, and router C 1710 provide redundant routing support to different portions of the primary router 1702. In one example, one or more blades or cards of router A 1706 provides redundant routing support to one or more blades of primary router 1704. If a portion of the primary router 1704 fails, then a portion of another router (e.g., the redundant supporting blade of Router A 1706) may provide routing services in place of the failed services and/or hardware.

In step 1714, the source network 1702 provides data to the primary router 1704. The data may comprise telephone calls, media, text, communications, or any other kind of data. In various embodiments, a variety of different data flows associated with different content is provided to the primary router 1704. Different blades (e.g., portions) route the data provided by the source network 1702 to different destinations of the destination network 1712 in step 1716.

While the primary router 1704 functions, the different routers (e.g., router A 1706, router B 1708, and router C 1710) that provide at least some redundant routing support of the blades of the primary router 1704 receive data information from the primary router 1704. The data information indicates what data streams (e.g., data flows) are being routed by the primary router 1704. The data information may allow the router providing routing support to keep track of what data would need to be routed if the primary router 1704 failed. For example, the primary router 1704 may provide data information about a media file being streamed over one of the primary router's blades to the router A 1706. A controller of router A 1706 may then receive and the data information. If the supported blade of the primary router 1704 fails, the controller will activate a blade in Router A 1706 to route the information associated with the media file to the proper destination of the destination network 1712.

In step 1718, data information regarding routing on a first blade of the primary router 1704 is provided to a controller of router A 1706. Similarly, in step 1720, data information regarding routing on a second blade of the primary router 1704 is provided to a controller of router B 1708. In step 1722, data information regarding routing on a third blade of the primary router 1704 is provided to a controller of router C 1710. The respective controllers of router A 1706, router B 1708, and router C 1710 may monitor the data information. As different information is routed by different blades of the primary router 1704, each controller may delete the previous data information in favor of the updated data information.

In step 1724, the primary router 1704 fails. In one example, a power failure renders the primary router 1704, and all of the blades of the primary router 1704, inoperative. In some embodiments, one or more network devices of the source network 1702 determine that the primary router 1704 has failed or is underperforming. Based on the determination, the one or more network devices of the source network 1702 redirect data from the first blade of primary router 1704 to router A 1706 (in step 1726), from the second blade of primary router 1704 to router B 1708 (in step 1730), and from the third blade of primary router 1704 to router C 1710 (in step 1734).

The blade of the router receiving the data redirected from the primary router 1704 may then route the data based in part on the data information previously received from the primary router 1704. For example, the controller of router A 1706 may configure a support blade of router A 1706 to receive and route the redirected data accordingly to the destination network 1712 in step 1728. Similarly, the controller of router B 1708 may configure a support blade of router B 1708 to receive and route the data accordingly to the destination network 1712 in step 1732. Further, the controller of router C 1710 may configure a support blade of router C 1710 to receive and route the data accordingly to the destination network 1712 in step 1736.

Data may continue to be routed through router A 1706, router B 1708, and router C 1710 until the primary router 1704 is functional and/or available.

In some embodiments, one blade on one router may back-up another blade on another router. Those skilled in the art will appreciate that multiple blades on one router may back a single blade on another router. Further, any number of blades on any number of routers may support any number of blades on a single router.

Figure 18:
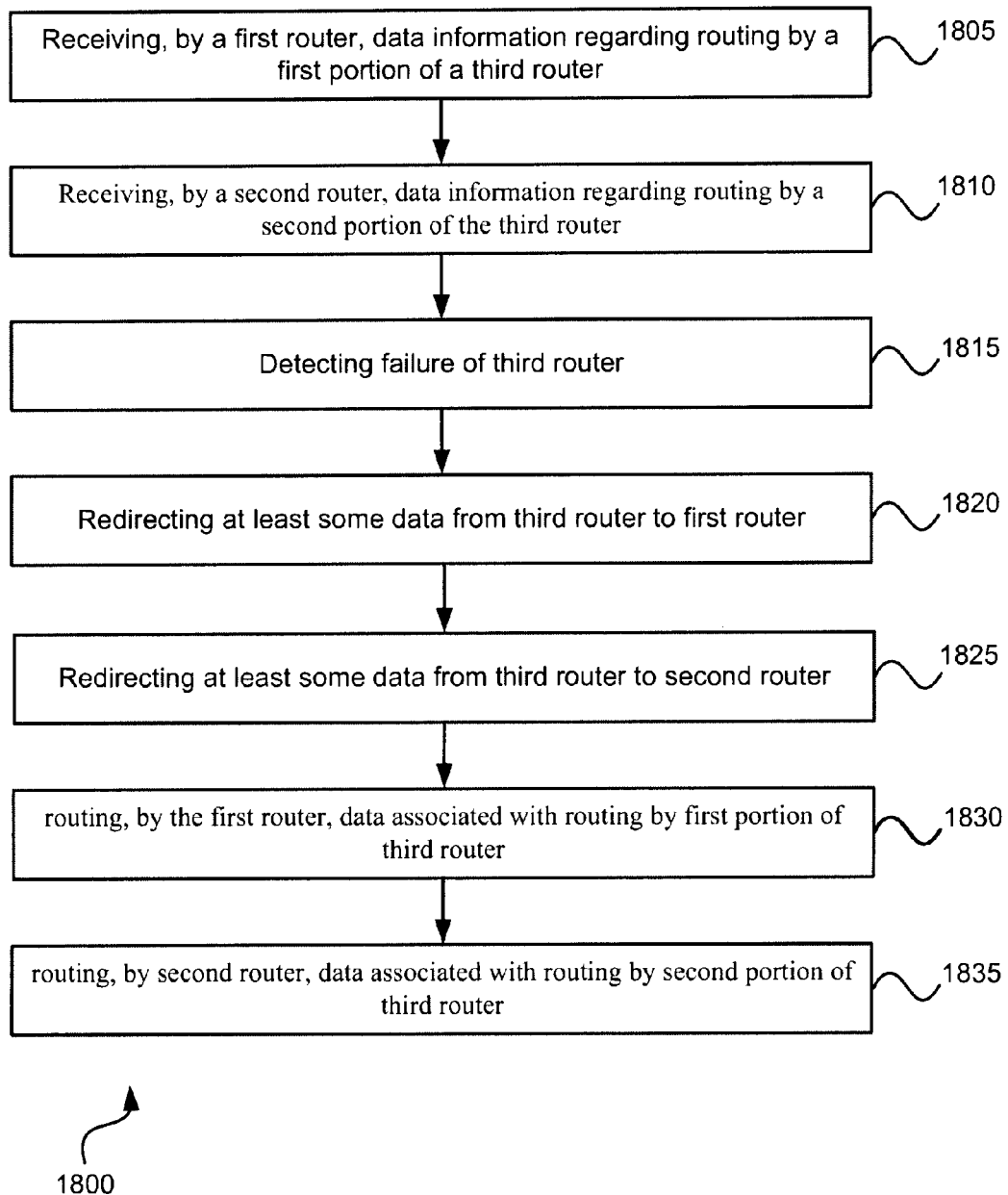
FIG. 18 is a flow diagram of an exemplary method for fractional router redundancy.

FIG. 18 is a flow diagram 1800 of an exemplary method for fractional router redundancy. In step 1805, a first router receives data information regarding routing by a portion of a third router. A portion may be any number of blades, cards, or other hardware. In some embodiments, a portion may comprise a portion of a blade, card, or hardware. In step 1810, a second router may receive data information regarding routing by a second portion of the third router.

In some embodiments, the first and second portions of the third router may comprise routing services being performed by the same hardware, blade, or card. For example, multiple data flows may be routed by a single blade. One data flow may represent a first portion and a second data flow may represent a second portion. In some embodiments, the first portion and the second portion of the third router are not the same portion.

Similarly, the data information regarding routing by the first portion may not be the same as data information regarding routing by the second portion. For example, the first portion may be a first blade and the data information regarding routing by the first portion may be data information that describes or identifies data that is to be routed by the first blade. Further, the second portion may be a second blade and the data information regarding routing by the second portion may be data information that describes or identifies data that is to be routed by the second blade.

In step 1815, a failure of the third router is detected. In some embodiments, a network device of a source network that provides data to the third router detects the failure and redirects data to a plurality of other routers in steps 1820 and 1825. In one example, one or more network devices redirects the data previously being provided to the first portion of the third router to the first router. Further, one or more network devices may redirect the data previously being provided to the second portion of the third router to the second router.

In various embodiments, the state (i.e., active or nonfunctional) of the third router is provided to the first and second routers (e.g., the state is received by controllers on the respective routers). When the state indicates that the third router is not functional or if the state is no longer received by the third router indicating that the third router is nonfunctional, the controller on each individual router may redirect data to the appropriate routing portion for back-up routing.

In step 1830, the first router routes the data associated with routing by the first portion of the third router (e.g., based on the data information regarding routing by the first portion). Similarly, in step 1835, the second router routes the data associated with routing by the second portion of the third router (e.g., based on the data information regarding routing by the second portion).

Figure 19:
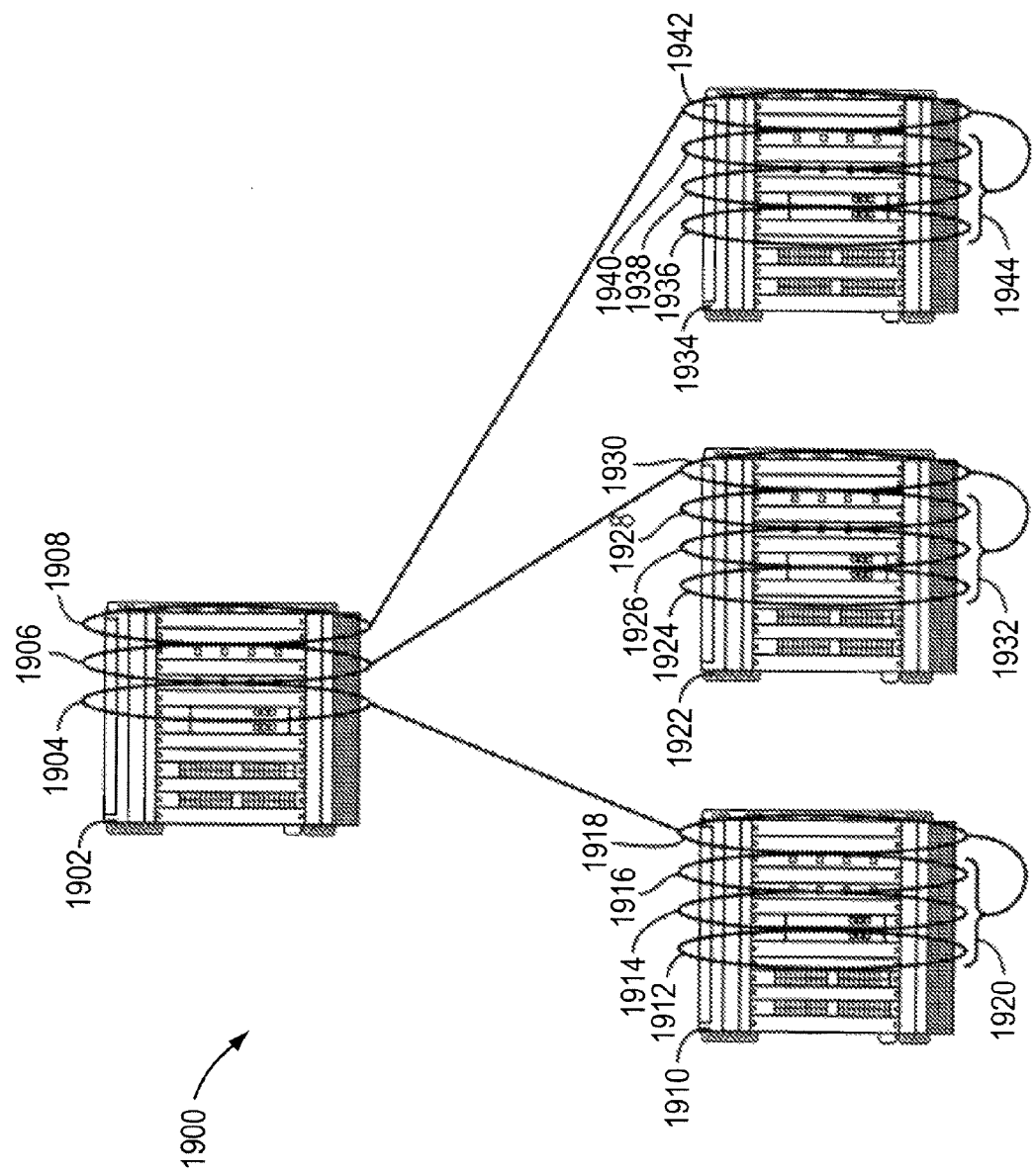
FIG. 19 is another bock diagram of fractional router redundancy in some embodiments.

FIG. 19 is another bock diagram 1900 of fractional router redundancy in some embodiments. A portion of a router may back-up the other portions of the same router as well as a portion of a different browser.

FIG. 19 depicts router 1902, router 1910, router 1922, and router 1934. Each router may comprise multiple portions. In FIG. 19, each portion is a blade. Router 1902 comprises blades 1904, 1906, and 1908. Blades on other routers may provide redundant routing services in case the blades 1904, 1906, and 1908. Router 1910 comprises blades 1912, 1914, 1916, and 1918. Router 1922 comprises blades 1924, 1926, 1928, and 1930. Router 1934 comprises blades 1936, 1938, 1940, and 1942.

Each of the routers 1910, 1922, and 1934 may each comprise a blade that provides redundancy services. Similarly, the same blade that provides redundancy services to the blade of router 1902 may also provides redundancy services to other blades. For example, blade 1918 of router 1910 may provide redundancy services to blade 1904 of router 1902 but also provides redundancy services for a portion 1920 of router 1910. Portion 1920 may comprise a group of blades such as blade 1912, 1914, and 1916. Portion 1920 may comprise any number of blades. Similarly, blade 1930 of router 1922 may provide redundancy services to blade 1906 of router 1902 but also provide redundancy services for a portion 1932 of router 1922. Portion 1922 may comprise a group of blades such as blade 1924, 1926, and 1928. Further, blade 1942 of router 1934 may provide redundancy services to blade 1908 of router 1902 but also provide redundancy services for a portion 1944 of router 1934. Portion 1944 may comprise a group of blades such as blade 1936, 1938, and 1940.

Those skilled in the art will appreciate that portions 1920, 1932, and 1944 may comprise hardware, software, or a combination of hardware and software.

In various embodiments, a fifth router, not depicted in FIG. 19, may also provide redundant services in case the back-up blades 1918, 1930, and/or 1942 are unavailable. For example, in some embodiments, the back-up blade 1918 may be unused until the router 1902, the blade 1904, or blades 1912, 1914, or 1916 fail or are unavailable. The back-up blade 1918 may then perform the routing functions of the failed and/or unavailable blade. However, if two blades fail, then the back-up blade 1918 may be limited to only perform the back-up services of one of the two blades.

In order to safeguard against multiple failures, a fifth router may be used. The fifth router may receive data information regarding one or more active portions of one or more routers. For example, the fifth router may receive data information regarding blades 1912, 1914, and 1916 of router 1910. The fifth router may also receive data information regarding blades 1924, 1926, and 1928. Further, the fifth router may also receive data information regarding blades 1936, 1937, and 1938. In the event that the back-up blade 1918 is busy, failed, or is otherwise unavailable, and one of the other blades of router 1910 fails, data may be rerouted from the failed blade to the fifth router in a manner discussed herein. The fifth router may provide similar support to the other routers 1932 and 1944.

Those skilled in the art will appreciate that the fifth router may comprise a controller to receive data information. Further, the fifth router may comprise any number of controllers.

The above-described functions and components can comprise instructions that are stored on a storage medium such as a computer readable medium. Some examples of instructions include software, program code, and firmware. The instructions can be retrieved and executed by a processor in many ways.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
   receiving, by a first back-up router from a primary router, first data identifying a first data stream, at least a portion of the first data stream initially to be routed by a first portion of the primary router, the first data for assisting the first back-up router to back-up the first portion of the primary router should the first portion of the primary router become unavailable;
   receiving, by a second back-up router from the primary router, second data identifying a second data stream, at least a portion of the second data stream initially to be routed by a second portion of the primary router, the second data for assisting the second back-up router to back-up the second portion of the primary router should the second portion of the primary router become unavailable, wherein the first data and the second data are not the same;
   receiving, by the first back-up router from a network source, the at least the portion of the first data stream;
   routing, by the first back-up router, the at least the portion of the first data stream when the first portion of the primary router becomes unavailable to route the at least the portion of the first data stream, the routing of the at least the portion of the first data stream by the first back-up router being based on the first data;
   receiving, by the second back-up router from the network source, the at least the portion of the second data stream; and
   routing, by the second back-up router, the at least the portion of the second data stream when the second portion of the primary router becomes unavailable to route the at least the portion of the second data stream, the routing of the at least the portion of the second data stream by the second back-up router being based on the second data.

2. The method of claim 1, wherein the first data comprises data information associated with the first data stream being routed by the first portion of the primary router and the second data comprises data information associated with the second data stream being routed by the second portion of the primary router.

3. The method of claim 1, further comprising receiving, by the first back-up router and the second back-up router, state information of the primary router.

4. The method of claim 1, further comprising determining that the primary router is not functional.

5. The method of claim 4, wherein the determination that the primary router is not functional is based, at least in part, on state information of the primary router.

6. The method of claim 1, wherein the first portion of the primary router is a blade.

7. The method of claim 1, wherein the first back-up router is configured to perform redundant routing services for the first portion of the primary router.

8. The method of claim 1, wherein the second back-up router is configured to perform redundant routing services for the second portion of the primary router.

9. The method of claim 1, wherein at least a portion of the second back-up router is configured to perform redundant routing services for both the second portion of the primary router and another portion of the second back-up router.

10. The method of claim 1, further comprising receiving, by a third back-up router, data information regarding routing by the first portion of the primary router and data information regarding routing by the second portion of the primary router.

11. The method of claim 10, wherein the third back-up router performs redundant routing services for, at least in part, both the first back-up router and the second back-up router.

12. The method of claim 1, further comprising redirecting the at least the portion of the first data stream to the first back-up router and redirecting the at least the portion of the second data stream to the second back-up router.

13. A system comprising:
  a first back-up router hardware configured to receive, from a primary router, first data identifying a first data stream, at least a portion of the first data stream initially to be routed by a first portion of the primary router, the first data for assisting the first back-up router hardware to back-up the first portion of the primary router should the first portion of the primary router become unavailable, the first back-up router hardware further configured to receive, from a network source, the at least the portion of the first data stream and to route the at least the portion of the first data stream based on the first data when the first portion of the primary router becomes unavailable to route the at least the portion of the first data stream;
  a second back-up router configured to receive, from the primary router, second data identifying a second data stream, at least a portion of the second data stream initially to be routed by a second portion of the primary router, the second data for assisting the second back-up router to back-up the second portion of the primary router should the second portion of the primary router become unavailable, the second back-up router further configured to receive, from the network source, the at least the portion of the second data stream and to route the at least the portion of the second data stream based on the second data when the second portion of the primary router becomes unavailable to route the at least the portion of the second data stream, wherein the first data and the second data are not the same; and
  the primary router comprising the first and second portions.

14. The system of claim 13, wherein the first data comprises data information associated with the first data stream being routed by the first portion of the primary router and the second data comprises data information associated with the second data stream being routed by the second portion of the primary router.

15. The system of claim 13, wherein the first back-up router hardware and the second back-up router are configured to receive state information of the primary router.

16. The system of claim 13, wherein the first back-up router hardware is configured to determine that the primary router is not functional.

17. The system of claim 16, wherein the determination that the primary router is not functional is based, at least in part, on state information of the primary router.

18. The system of claim 13, wherein the first portion of the primary router is a blade.

19. The system of claim 13, wherein the first back-up router hardware is configured to perform redundant routing services for the first portion of the primary router.

20. The system of claim 13, wherein the second back-up router is configured to perform redundant routing services for the second portion of the primary router.

21. The system of claim 13, wherein at least a portion of the second back-up router is configured to perform redundant routing services for both the second portion of the primary router and another portion of the second back-up router.

22. The system of claim 13, further comprising a third back-up router configured to receive data information regarding routing by the first portion of the primary router and data information regarding routing by the second portion of the primary router.

23. The system of claim 22, wherein the third back-up router is further configured to perform redundant routing services for, at least in part, both the first back-up router hardware and the second back-up router.

24. The system of claim 13, wherein the network device is configured to redirect the at least the portion of the first data stream to the first back-up router hardware and to redirect the at least the portion of the second data stream to the second back-up router.

25. A system comprising:
  a first back-up routing means configured to receive, from a primary routing means, first data identifying a first data stream, at least a portion of the first data stream initially to be routed by a first portion of the primary routing means, the first data for assisting the first back-up routing means to back-up the first portion of the primary routing means should the first portion of the primary routing means become unavailable, the first back-up routing means further configured to receive, from a network source, the at least the portion of the first data stream and to route the at least the portion of the first data stream based on the first data when the first portion of the primary routing means becomes unavailable to route the at least the portion of the first data stream;
  a second back-up routing means configured to receive, from the primary routing means, second data identifying a second data stream, at least a portion of the second data stream initially to be routed by a second portion of the primary routing means, the second data for assisting the second back-up routing means to back-up the second portion of the primary routing means should the second portion of the primary routing means become unavailable, the second back-up routing means further configured to receive, from the network source, the at least the portion of the second data stream and to route the at least the portion of the second data stream based on the second data when the second portion of the primary routing means becomes unavailable to route the at least the portion of the second data stream, wherein the first data and the second data are not the same; and
  the primary routing means comprising the first and second portions.

26. The method of claim 1, wherein the first portion of the primary router becomes unavailable when the first portion has failed, is nonfunctional, or is busy, and wherein the second portion of the primary router becomes unavailable when the second portion has failed, is nonfunctional, or is busy.

27. The system of claim 13, wherein the first portion of the primary router becomes unavailable when the first portion has failed, is nonfunctional, or is busy, and wherein the second portion of the primary router becomes unavailable when the second portion has failed, is nonfunctional, or is busy.

28. The method of claim 1, wherein the first back-up router and the primary router are geographically diverse from one another.

29. The system of claim 13, wherein the first back-up router hardware and the primary router are geographically diverse from one another.

30. A method comprising:
  receiving, by a primary router, a first data stream from at least one network source, a first portion of the primary router being configured to route the first data stream;
  transmitting, by the primary router to a first back-up router, first data information identifying the first data stream, the first data information for assisting the first back-up router to route the first data stream should the first portion of the primary router become unavailable;
  receiving, by the primary router, a second data stream from the at least one network source, a second portion of the primary router being configured to route the second data stream;

transmitting, by the primary router to a second back-up router, second data information identifying the second data stream, the second data information for assisting the second back-up router to route the second data stream should the second portion of the primary router become unavailable;

monitoring the first portion of the primary router to determine when the first portion of the primary router becomes unavailable so that the at least one network source can redirect the first data stream to the first back-up router; and monitoring the second portion of the primary router to determine when the second portion of the primary router becomes unavailable so that the at least one network source can redirect the second data stream to the second back-up router.

* * * * *